(12) United States Patent
Mikoshiba et al.

(10) Patent No.: US 12,247,632 B2
(45) Date of Patent: Mar. 11, 2025

(54) VIBRATION-DAMPING DEVICE

(71) Applicant: Prospira Corporation, Kawasaki (JP)

(72) Inventors: Rei Mikoshiba, Tokyo (JP); Yuki Satake, Tokyo (JP); Akira Ueki, Tokyo (JP)

(73) Assignee: Prospira Corporation, Kanagawa (JP)

( * ) Notice: Subject to any disclaimer, the term of this patent is extended or adjusted under 35 U.S.C. 154(b) by 487 days.

(21) Appl. No.: 17/772,372

(22) PCT Filed: Nov. 9, 2020

(86) PCT No.: PCT/JP2020/041665
§ 371 (c)(1),
(2) Date: Apr. 27, 2022

(87) PCT Pub. No.: WO2021/090946
PCT Pub. Date: May 14, 2021

(65) Prior Publication Data
US 2022/0373058 A1   Nov. 24, 2022

(30) Foreign Application Priority Data

Nov. 7, 2019 (JP) .................................. 2019-202574
Nov. 7, 2019 (JP) .................................. 2019-202580
Nov. 7, 2019 (JP) .................................. 2019-202590

(51) Int. Cl.
*F16F 13/10* (2006.01)
*B60K 5/12* (2006.01)

(52) U.S. Cl.
CPC .......... *F16F 13/107* (2013.01); *B60K 5/1208* (2013.01); *F16F 13/108* (2013.01); *F16F 2228/066* (2013.01); *F16F 2230/36* (2013.01)

(58) Field of Classification Search
None
See application file for complete search history.

(56) References Cited

U.S. PATENT DOCUMENTS 4,651,980 A   3/1987   Morita et al.
4,679,776 A   7/1987   Remmel et al.
(Continued)

FOREIGN PATENT DOCUMENTS

CN   1796821 A    7/2006
CN   101285513 A  10/2008
(Continued)

OTHER PUBLICATIONS

JP 2553356 Y2—English Machine Translation (Year: 1997).*
(Continued)

*Primary Examiner* — Melanie Torres Williams
(74) *Attorney, Agent, or Firm* — KENJA IP LAW PC

(57) ABSTRACT

The present invention includes a first attachment member (11, 111), a second attachment member (12, 112), an elastic body (13, 113), a partition member (16, 116), and a movable member (41, 141). An orifice passage (24, 124), a plurality of first communication holes (42a, 142a), and a second communication hole (42b, 142b) are formed in the partition member (41, 141). A tubular member (21, 121) is disposed on a first wall surface (16b, 116b) in the partition member (16, 116). The plurality of first communication holes (42a, 142a) are open to both an inner portion (16f, 116f) and an outer portion (16g, 116g) on the first wall surface (16b, 116b), and one of the partition member (16) and the tubular member (121) forms an elasticity adjusting unit (Z).

20 Claims, 6 Drawing Sheets

(56) References Cited

U.S. PATENT DOCUMENTS

| | | |
|---|---|---|
| 4,708,329 A | 11/1987 | Tabata et al. |
| 4,721,292 A | 1/1988 | Saito |
| 4,773,634 A | 9/1988 | Hamaekers |
| 4,903,951 A | 2/1990 | Miyamoto et al. |
| 4,925,162 A | 5/1990 | Kojima |
| 4,997,168 A | 3/1991 | Kato |
| 5,102,105 A | 4/1992 | Hamaekers et al. |
| 5,464,196 A | 11/1995 | Dankowski |
| 5,499,799 A | 3/1996 | Kojima |
| 6,257,562 B1 | 7/2001 | Takashima et al. |
| 6,390,459 B2 | 5/2002 | Saitoh |
| 6,612,554 B1 | 9/2003 | Linn |
| 6,637,734 B2 | 10/2003 | Thomazeau et al. |
| 6,793,206 B2 | 9/2004 | Reh et al. |
| 6,923,435 B2 | 8/2005 | Pizanti et al. |
| 7,258,331 B2 | 8/2007 | Schneider |
| 7,344,128 B2 | 3/2008 | Muramatsu et al. |
| 7,802,777 B2 | 9/2010 | Katayama et al. |
| 8,474,799 B2 | 7/2013 | Michiyama et al. |
| 8,894,051 B2 | 11/2014 | Yamamoto et al. |
| 9,046,147 B2 | 6/2015 | Tsutsumi |
| 9,273,744 B2 | 3/2016 | West |
| 9,347,516 B2 | 5/2016 | Kadowaki |
| 9,365,101 B2 | 6/2016 | Okumura |
| 9,366,309 B2 | 6/2016 | Marienfeld et al. |
| 9,488,246 B2 | 11/2016 | Satori et al. |
| 9,719,575 B2 | 8/2017 | Kojima |
| 9,726,251 B2 | 8/2017 | Nagasawa et al. |
| 9,772,002 B2 | 9/2017 | Ueki et al. |
| 9,878,604 B2 | 1/2018 | Furusawa et al. |
| 10,030,738 B2 | 7/2018 | Ueki et al. |
| 10,422,404 B2 | 9/2019 | Oniwa |
| 10,436,281 B2 | 10/2019 | Kim |
| 10,584,761 B2 | 3/2020 | Fourman |
| 10,589,615 B2 | 3/2020 | Chern et al. |
| 10,781,881 B2 | 9/2020 | Ishikawa |
| 10,989,269 B2 | 4/2021 | Kojima |
| 11,241,949 B2 | 2/2022 | Beckmann et al. |
| 11,428,290 B2 | 8/2022 | Ueki et al. |
| 11,441,634 B2 | 9/2022 | Nagashima et al. |
| 11,959,527 B2 | 4/2024 | Satake et al. |
| 2002/0043748 A1 | 4/2002 | Meyer |
| 2003/0030202 A1 | 2/2003 | Thomazeau et al. |
| 2003/0038414 A1 | 2/2003 | Pizanti et al. |
| 2003/0085498 A1 | 5/2003 | Reh et al. |
| 2005/0206056 A1 | 9/2005 | Maeno et al. |
| 2006/0097435 A1 | 5/2006 | Yoneyama et al. |
| 2008/0290573 A1 | 11/2008 | Katayama et al. |
| 2009/0008195 A1 | 1/2009 | Ueki |
| 2009/0140476 A1 | 6/2009 | Michiyama et al. |
| 2009/0140477 A1 | 6/2009 | Michiyama |
| 2009/0243171 A1 | 10/2009 | Nanno et al. |
| 2009/0283945 A1 | 11/2009 | Kojima et al. |
| 2010/0072683 A1 | 3/2010 | Saito et al. |
| 2010/0102495 A1 | 4/2010 | Okumura et al. |
| 2012/0018935 A1 | 1/2012 | Ogasawara |
| 2013/0069289 A1 | 3/2013 | Ishikawa et al. |
| 2013/0154171 A1 | 6/2013 | Nishi et al. |
| 2014/0327199 A1 | 11/2014 | Kanaya |
| 2015/0028530 A1 | 1/2015 | Kanaya et al. |
| 2015/0048562 A1 | 2/2015 | Satori et al. |
| 2015/0330476 A1 | 11/2015 | Satori et al. |
| 2015/0337919 A1 | 11/2015 | Kojima |
| 2016/0053844 A1 | 2/2016 | Nagasawa et al. |
| 2016/0053845 A1 | 2/2016 | Ueki et al. |
| 2016/0053846 A1 | 2/2016 | Nagasawa et al. |
| 2016/0195154 A1 | 7/2016 | Komiya et al. |
| 2016/0223048 A1 | 8/2016 | Kojima |
| 2017/0023089 A1 | 1/2017 | Ueki |
| 2017/0030428 A1 | 2/2017 | Ueki |
| 2017/0089420 A1 | 3/2017 | Kadowaki et al. |
| 2017/0335920 A1 | 11/2017 | Kanaya et al. |
| 2018/0051769 A1 | 2/2018 | Kim |
| 2018/0073591 A1 | 3/2018 | Nagasawa et al. |
| 2019/0017567 A1 | 1/2019 | Kim |
| 2019/0061509 A1 | 2/2019 | Kim |
| 2019/0092155 A1 | 3/2019 | Inoue et al. |
| 2019/0128364 A1 | 5/2019 | Kim |
| 2019/0285133 A1 | 9/2019 | Ishikawa |
| 2020/0049224 A1 | 2/2020 | Ueki et al. |
| 2020/0400210 A1 | 12/2020 | Ueki et al. |
| 2021/0239180 A1 | 8/2021 | Satake et al. |
| 2022/0373058 A1 | 11/2022 | Mikoshiba et al. |
| 2022/0397177 A1 | 12/2022 | Satake et al. |
| 2022/0403911 A1 | 12/2022 | Mikoshiba et al. |
| 2022/0403912 A1 | 12/2022 | Mikoshiba et al. |

FOREIGN PATENT DOCUMENTS

| | | |
|---|---|---|
| CN | 101305205 A | 11/2008 |
| CN | 101883932 A | 11/2010 |
| CN | 102395810 A | 3/2012 |
| CN | 102725558 A | 10/2012 |
| CN | 103363013 A | 10/2013 |
| CN | 104169609 A | 11/2014 |
| CN | 105757160 A | 7/2016 |
| CN | 106574682 A | 4/2017 |
| CN | 106641087 A | 5/2017 |
| CN | 106662195 A | 5/2017 |
| CN | 108980261 A | 12/2018 |
| CN | 109690127 A | 4/2019 |
| CN | 110192045 A | 8/2019 |
| CN | 110273968 A | 9/2019 |
| CN | 112074672 A | 12/2020 |
| DE | 102016101203 A1 | 7/2017 |
| EP | 1028268 A2 | 8/2000 |
| EP | 1283377 A1 | 2/2003 |
| FR | 2604231 A1 | 3/1988 |
| GB | 2282430 A | 4/1995 |
| JP | H01193426 A | 8/1989 |
| JP | H01224544 A * | 9/1989 |
| JP | H0522890 U | 3/1993 |
| JP | H084823 A | 1/1996 |
| JP | 2553356 Y2 * | 11/1997 |
| JP | 2002155984 A | 5/2002 |
| JP | 2002295571 A | 10/2002 |
| JP | 2002-327789 A | 11/2002 |
| JP | 2003-130125 A | 5/2003 |
| JP | 2006200590 A | 8/2006 |
| JP | 2007-182930 A | 7/2007 |
| JP | 2007218420 A | 8/2007 |
| JP | 2009243543 A | 10/2009 |
| JP | 2010-31989 A | 2/2010 |
| JP | 2012172736 A | 9/2012 |
| JP | 2013032828 A | 2/2013 |
| JP | 2013-228004 A | 11/2013 |
| JP | 2013228003 A | 11/2013 |
| JP | 2013231454 A | 11/2013 |
| JP | 5642241 B1 | 12/2014 |
| JP | 2015059655 A | 3/2015 |
| JP | 2021076164 A | 5/2021 |
| JP | 2021076165 A | 5/2021 |
| JP | 2021076168 A | 5/2021 |
| JP | 2021076169 A | 5/2021 |
| JP | 2021076170 A | 5/2021 |
| JP | 2021076172 A | 5/2021 |
| JP | 2021076173 A | 5/2021 |
| WO | 2018198444 A1 | 11/2018 |
| WO | 2019/216403 A1 | 11/2019 |

OTHER PUBLICATIONS

JPH01224544A—English Machine Translation (Year: 1989).*

Jul. 12, 2024, search result of Office Action issued by the China National Intellectual Property Administration in the related Chinese Patent Application No. 202080076453.6.

May 25, 2024, search result of Office Action issued by the China National Intellectual Property Administration in the related Chinese Patent Application No. 202080076453.6.

May 30, 2024, search result of Office Action issued by the China National Intellectual Property Administration in the related Chinese Patent Application No. 202080075597.X.

(56) References Cited

OTHER PUBLICATIONS

May 30, 2024, search result of Office Action issued by the China National Intellectual Property Administration in the related Chinese Patent Application No. 202080075442.6.
Sep. 10, 2024, search result of Office Action issued by the China National Intellectual Property Administration in the related Chinese Patent Application No. 202080075597.X.
Apr. 25, 2023, Office Action issued by the United States Patent and Trademark Office in the U.S. Appl. No. 17/050,868.
Aug. 27, 2021, search result of Office Action issued by the China National Intellectual Property Administration in the corresponding Chinese Patent Application No. 201980030454.4.
Dec. 1, 2021, search result of the Extended European Search Report issued by the European Patent Office in the corresponding European Patent Application No. 19799394.2.
Dec. 28, 2020, International Search Report issued in the International Patent Application No. PCT/JP2020/041719.
Dec. 8, 2020, International Search Report issued in the International Patent Application No. PCT/JP2020/041370.
Dec. 8, 2020, International Search Report issued in the International Patent Application No. PCT/JP2020/041609.
Jul. 23, 2019, International Search Report issued in the International Patent Application No. PCT/JP2019/018695.
May 10, 2022, International Preliminary Report on Patentability issued in the International Patent Application No. PCT/JP2020/038572.
May 10, 2022, International Preliminary Report on Patentability issued in the International Patent Application No. PCT/JP2020/041370.
May 10, 2022, International Preliminary Report on Patentability issued in the International Patent Application No. PCT/JP2020/041609.
May 10, 2022, International Preliminary Report on Patentability issued in the International Patent Application No. PCT/JP2020/041665.
May 10, 2022, International Preliminary Report on Patentability issued in the International Patent Application No. PCT/JP2020/041719.
Nov. 10, 2020, International Preliminary Report on Patentability issued in the International Patent Application No. PCT/JP2019/018695.
Nov. 10, 2020, International Search Report issued in the International Patent Application No. PCT/JP2020/038572.
International Search Report for PCT/JP2020/041665 dated, Dec. 8, 2020 (PCT/ISA/210).
Dec. 14, 2024, search result of Office Action issued by the China National Intellectual Property Administration in the corresponding Chinese Patent Application No. 202080075463.8.

* cited by examiner

VIBRATION-DAMPING DEVICE

CROSS REFERENCE TO RELATED APPLICATIONS

This application is a National Stage of International Application No. PCT/JP2020/041665 filed Nov. 9, 2020, claiming priority based on Japanese Patent Application No. 2019-202574 filed on Nov. 7, 2019, Japanese Patent Application No. 2019-202580 filed on Nov. 7, 2019, Japanese Patent Application No. 2019-202590 filed on Nov. 7, 2019.

TECHNICAL FIELD

The present invention relates to a vibration-damping device that is applied to, for example, automobiles, industrial machines, or the like, and absorbs and damps vibrations of vibration generating parts, such as engines.

BACKGROUND ART

As this type of vibration-damping device, in the related art, there has been known a configuration including: a tubular first attachment member that is coupled to one of a vibration generating part and a vibration receiving part, and a second attachment member that is coupled to the other thereof; an elastic body that elastically couples both the first and second attachment members to each other; a partition member that partitions a liquid chamber into a main liquid chamber and an auxiliary liquid chamber, the liquid chamber in which a liquid is enclosed and with which the first attachment member is provided, the main liquid chamber having the elastic body as a portion of a partition wall; and a movable member that is deformably or displaceably accommodated in an accommodation chamber provided in the partition member. The partition member is provided with an orifice passage, plurality of first communication holes, and a second communication hole, the orifice passage which allows the main liquid chamber and the auxiliary liquid chamber to communicate with each other, the plurality of first communication holes which allow the main liquid chamber and the accommodation chamber to communicate with each other, and the second communication hole that allows the auxiliary liquid chamber and the accommodation chamber to communicate with each other. In this vibration-damping device, when a relatively high frequency idle vibration of low frequency vibration having a frequency of less than 200 Hz is input in an axial direction, the idle vibration is damped and absorbed by causing the liquid in the liquid chamber to flow through the first communication holes and the second communication hole while deforming and displacing the movable member in the accommodation chamber. Additionally, when shake vibration having a relatively low frequency is input in the axial direction, the shake vibration is dampened and absorbed by causing the liquid in the liquid chamber to flow through the orifice passage.

CITATION LIST

Patent Document

[Patent Document 1]
Japanese Unexamined Patent Application, First Publication No. 2002-327789

SUMMARY OF INVENTION

Technical Problem

However, the related-art vibration-damping device cannot damp and absorb medium frequency vibration having a frequency of 200 Hz to 1000 Hz.

The present invention has been made in view of the above circumstances, and an object of the present invention is to provide a vibration-damping device capable of damping and absorbing medium frequency vibration.

Solution to Problem

A vibration-damping device according to a first aspect of the present invention is vibration-damping device including: a tubular first attachment member that is coupled to one of a vibration generating part and a vibration receiving part, and a second attachment member that is coupled to the other thereof; an elastic body that elastically couples both the first and second attachment members to each other; a partition member that partitions a liquid chamber into a main liquid chamber and an auxiliary liquid chamber, the liquid chamber in an axial direction along a central axis of the first attachment member, the liquid chamber in which a liquid is enclosed and with which the first attachment member is provided, the main liquid chamber having the elastic body as a portion of a partition wall; and a movable member that is deformably or displaceably accommodated in an accommodation chamber provided in the partition member. The partition member is provided with an orifice passage, a plurality of first communication holes, and a second communication hole, the orifice passage which allows the main liquid chamber and the auxiliary liquid chamber to communicate with each other, the plurality of first communication holes which allow the main liquid chamber and the accommodation chamber to communicate with each other, and the second communication hole which allows the auxiliary liquid chamber and the accommodation chamber to communicate with each other. A tubular member is disposed on a first wall surface of the partition member, the tubular member which protrudes in the axial direction toward the elastic body, the first wall surface to which the first communication hole is open and which constitutes a portion of an inner surface of the main liquid chamber. The plurality of first communication holes are open to both an inner portion and an outer portion on the first wall surface, the inner portion located inside the tubular member, and the outer portion located outside the tubular member. One of the partition member and the tubular member forms an elasticity adjusting unit in which an elasticity of the elastic body is made to be apparently different in a circumferential direction along the central axis.

Effects of Invention

According to the present invention, the medium frequency vibration can be damped and absorbed.

DESCRIPTION OF EMBODIMENTS

First Embodiment

Hereinafter, a first embodiment of a vibration-damping device according to the present invention will be described with reference to FIGS. 1 and 2.

Figure 1:
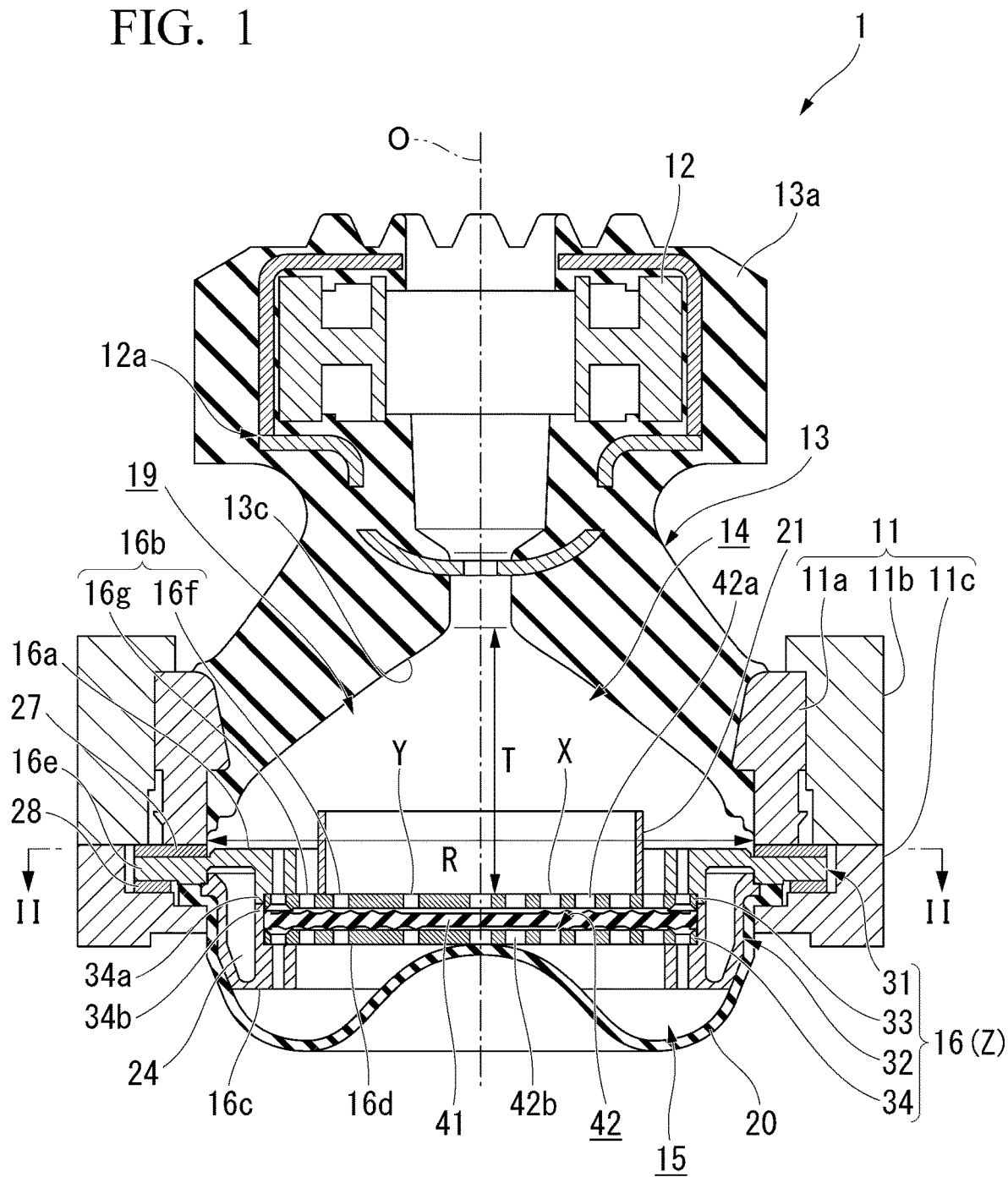
FIG. 1 is a longitudinal sectional view of a vibration-damping device according to a first embodiment of the present invention.

As shown in FIG. 1, the vibration-damping device 1 is a liquid-enclosed type vibration-damping device including a tubular first attachment member 11 that is coupled to any one of a vibration generating part and a vibration receiving part, a second attachment member 12 that is coupled to the other of the vibration generating part and the vibration receiving part, an elastic body 13 that elastically couples the first attachment member 11 and the second attachment member 12 to each other, a partition member 16 (i.e., elasticity adjusting unit Z) that partitions a liquid chamber 19 within the first attachment member 11 in which a liquid is enclosed into a main liquid chamber 14 having an elastic body 13 as a portion of a partition wall and an auxiliary liquid chamber 15, and a movable member 41 that is deformably or displaceably accommodated in an accommodation chamber 42 provided in the partition member 16. The elasticity adjusting unit Z will be described in detail below.

Hereinafter, a direction along a central axis O of the first attachment member 11 is referred to as an axial direction. Additionally, the second attachment member 12 side in the axial direction is referred to as an upper side, and the partition member 16 side is referred to as a lower side. Additionally, in a plan view of the vibration-damping device 1 viewed from the axial direction, a direction intersecting the central axis O is referred to as a radial direction, and a direction around the central axis O is referred to as a circumferential direction.

In addition, the first attachment member 11, the second attachment member 12, and the elastic body 13 each have a circular shape or an annular shape in a plan view and are disposed coaxially with the central axis O.

In a case where the vibration-damping device 1 is mounted on, for example, an automobile, the second attachment member 12 is coupled to an engine or the like serving as the vibration generating part, and the first attachment member 11 is coupled to a vehicle body serving as the vibration receiving part. Accordingly, the transmission of vibration of the engine or the like to the vehicle body is suppressed. In addition, the first attachment member 11 may be coupled to the vibration generating part, and the second attachment member 12 may be coupled to the vibration receiving part.

The first attachment member 11 includes an inner tubular portion 11a, an outer tubular portion 11b, and a lower support portion 11c. The inner tubular portion 11a is fitted into the outer tubular portion 11b. The lower support portion 11c is formed in an annular shape. A lower end opening edge of the outer tubular portion 11b is placed on an upper surface of an outer peripheral portion of the lower support portion 11c. The first attachment member 11 is formed in a cylindrical shape as a whole. The first attachment member 11 is coupled to the vehicle body or the like serving as the vibration receiving part via a bracket that is not shown.

The second attachment member 12 is located radially inside and above the first attachment member 11. The outer diameter of the second attachment member 12 is smaller than the inner diameter of the first attachment member 11. The second attachment member 12 is coupled to an engine or the like serving as the vibration generating part via an attachment metal fitting by fitting an attachment metal fitting (that is not shown) inside.

In addition, the relative positions of the first attachment member 11 and the second attachment member 12 are not limited to the shown example and may be appropriately changed. Additionally, the outer diameter of the second attachment member 12 may be equal to or larger than the inner diameter of the first attachment member 11.

The elastic body 13 is formed in a tubular shape that extends in the axial direction. The diameter of the elastic body 13 increases downward from above.

The first attachment member 11 and the second attachment member 12 are separately coupled to both end portions of the elastic body 13 in the axial direction. The second attachment member 12 is coupled to an upper end portion of the elastic body 13, and the first attachment member 11 is coupled to a lower end portion of the elastic body 13. The elastic body 13 blocks an upper end opening portion of the first attachment member 11. The lower end portion of the elastic body 13 is coupled to an inner peripheral surface of the inner tubular portion 11a of the first attachment member 11. An upper end portion of the elastic body 13 is coupled to a lower surface of the second attachment member 12. The elastic body 13 is formed of a rubber material or the like and is vulcanized and bonded to the first attachment member 11 and the second attachment member 12. The thickness of the elastic body 13 becomes smaller downward from above. In addition, the elastic body 13 may be formed of, for example, a synthetic resin material or the like.

A stopper rubber 13a that covers an outer peripheral surface and an upper surface of the second attachment member 12 is integrally formed at the upper end portion of the elastic body 13. An outer shell body 12a surrounding the second attachment member 12 is buried in the elastic body 13 and the stopper rubber 13a.

The diaphragm 20 is made of elastic materials, such as rubber or soft resin and is formed in a bottomed cylindrical shape. As an upper end portion of the diaphragm 20 is sandwiched between an inner peripheral portion of the lower support portion 11c of the first attachment member 11 and an outer peripheral portion of the partition member 16, the liquid-tightness inside the diaphragm 20 is ensured, and a lower end opening portion of the first attachment member 11 is blocked.

In addition, in the shown example, a bottom portion of the diaphragm 20 has a shape that is deep on an outer peripheral side thereof and shallow at a central portion thereof. However, as the shape of the diaphragm 20, various shapes known in the related art can be adopted in addition to such a shape.

As the diaphragm 20 blocks the lower end opening portion of the first attachment member 11, and as described above, the elastic body 13 blocks the upper end opening portion of the first attachment member 11, the inside of the first attachment member 11 is the liquid chamber 19 that is liquid-tightly sealed. A liquid is enclosed (i.e., filled) in the liquid chamber 19. Examples of the liquid include ethylene glycol, water, silicone oil, and the like.

The liquid chamber 19 is partitioned into a main liquid chamber 14 and an auxiliary liquid chamber 15 in the axial direction by the partition member 16. The main liquid chamber 14 has an inner peripheral surface 13c of the elastic body 13 as a portion of a wall surface thereof, and is a space that is surrounded by the elastic body 13 and the partition member 16, and varies in internal volume depending on the deformation of the elastic body 13. The auxiliary liquid chamber 15 is a space that is surrounded by the diaphragm 20 and the partition member 16 and varies in internal volume depending on the deformation of the diaphragm 20. The vibration-damping device 1 having such a configuration is a compression-type device that is attached and used such that the main liquid chamber 14 is located on an upper side in the vertical direction and the auxiliary liquid chamber 15 is located on a lower side in the vertical direction.

The partition member 16 is formed with a plurality of first communication holes 42a that allow the main liquid chamber 14 and the accommodation chamber 42 to communicate with each other, and a second communication hole 42b that allows the auxiliary liquid chamber 15 and the accommodation chamber 42 to communicate with each other. A plurality of the second communication holes 42b are formed in the partition member 16, and the numbers of the first communication holes 42a and the second communication holes 42b are the same as each other. Each first communication hole 42a and each second communication hole 42b face each other in the axial direction. The inner diameters (i.e., flow passage cross-sectional areas) of the first communication hole 42a and the second communication hole 42b facing each other in the axial direction are the same as each other. The flow passage lengths of the first communication hole 42a and the second communication hole 42b facing each other in the axial direction are the same as each other. In addition, one second communication hole 42b may be formed in the partition member 16.

Here, in the partition member 16, an upper wall surface constituting a portion of an inner surface of the main liquid chamber 14 and a lower wall surface constituting a portion of an inner surface of the auxiliary liquid chamber 15 each have a circular shape coaxially disposed with the central axis O when viewed from the axial direction. The diameters of the upper wall surface and the lower wall surface of the partition member 16 are equal to each other. The upper wall surface of the partition member 16 faces the inner peripheral surface 13c of the elastic body 13 in the axial direction, and the lower wall surface of the partition member 16 faces an inner surface of the diaphragm 20 in the axial direction.

In the shown example, a recessed portion is formed over the entire region excluding an outer peripheral edge portion 16a on the upper wall surface of the partition member 16. The plurality of first communication holes 42a are open over the entire region of a bottom surface (hereinafter referred to as a first wall surface) 16b of the recessed portion. A recessed portion is formed over the entire region excluding an outer peripheral edge portion 16c on the lower wall surface of the partition member 16. The plurality of second communication holes 42b are open over the entire region of a bottom surface (hereinafter referred to as a second wall surface) 16d of the recessed portion. The recessed portion on each of the upper wall surface and the lower wall surface has a circular shape disposed coaxially with the central axis O when viewed from the axial direction, and sizes such as the inner diameter and the depth of each recessed portion are the same as each other.

The accommodation chamber 42 is formed in a portion of the partition member 16 located in the axial direction between the first wall surface 16b and the second wall surface 16d. The accommodation chamber 42 has a circular shape disposed coaxially with the central axis O when viewed from the axial direction. The diameter of the accommodation chamber 42 is larger than the diameters of the first wall surface 16b and the second wall surface 16d.

The movable member 41 is formed in a plate shape in which the front and back surfaces face in the axial direction. The movable member 41 has a circular shape disposed coaxially with the central axis O when viewed from the axial direction. The movable member 41 is formed of an elastic material such as rubber or a soft resin.

The partition member 16 is formed with an orifice passage 24 that allows the main liquid chamber 14 and the auxiliary liquid chamber 15 to communicate with each other. The orifice passage 24 is formed in a portion of the partition member 16 located in the axial direction between the outer peripheral edge portion 16a of the upper wall surface and the outer peripheral edge portion 16c of the lower wall surface. An upper end of the orifice passage 24 is located above the first wall surface 16b, and a lower end of the orifice passage 24 is located below the second wall surface 16d. The flow passage cross-sectional shape of the orifice passage 24 is an oblong shape long in the axial direction. The resonance frequency of the orifice passage 24 is lower than the resonance frequencies of the first communication hole 42a and the second communication hole 42b.

Figure 2:
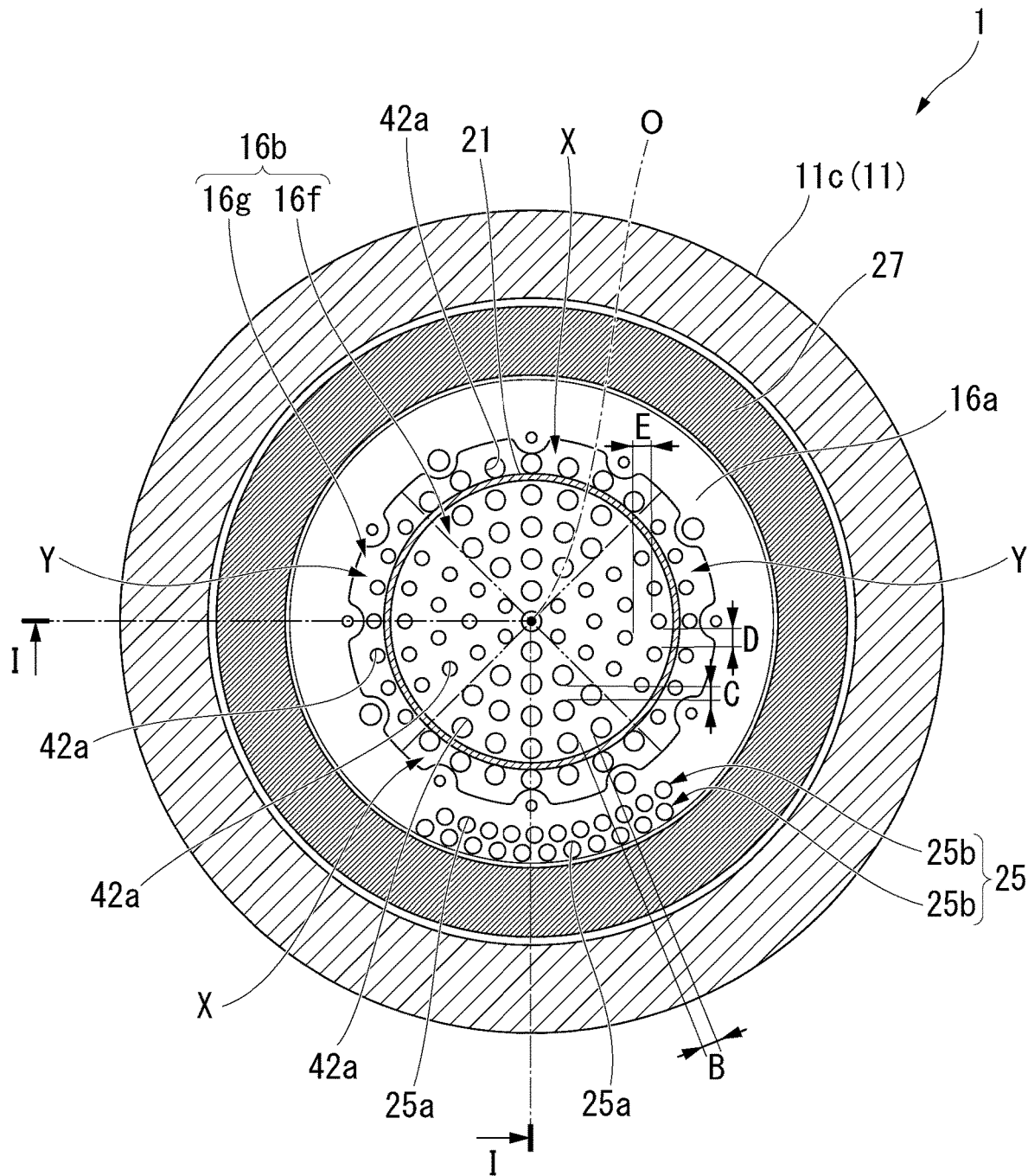
FIG. 2 is a cross-sectional view, taken along arrow line II-II, of the vibration-damping device shown in FIG. 1.

As shown in FIG. 2, an opening portion 25 of the orifice passage 24 on the main liquid chamber 14 side is formed on the outer peripheral edge portion 16a of the upper wall surface of the partition member 16. The opening portion 25 is configured such that a plurality of hole rows 25b in which a plurality of through-holes 25a are disposed at intervals in the circumferential direction are disposed at different positions in the radial direction and the circumferential direction. The inner diameter of the through-hole 25a is smaller than the inner diameter of the first communication hole 42a. Two hole rows 25b are disposed on the outer peripheral edge portion 16a of the upper wall surface of the partition member 16. The deviation amount of each hole row 25b in the circumferential direction and the deviation amount of each hole row 25b in the radial direction are each equal to the inner diameter of the through-hole 25a.

An opening portion on the auxiliary liquid chamber 15 side of the orifice passage 24 is formed on the outer peripheral edge portion 16c of the lower wall surface of the partition member 16 and is one opening having an opening area larger than the opening area of the opening portion 25 on the main liquid chamber 14 side, that is, the total sum of the opening areas of the plurality of through-holes 25a. The opening portion 25 on the main liquid chamber 14 side and the opening portion on the auxiliary liquid chamber 15 side in the orifice passage 24 are located radially outside the first communication hole 42a and the second communication hole 42b.

A flange portion 16e is formed at an upper end portion of the partition member 16 so as to protrude radially outward and continuously extend over the entire circumference. An upper surface of the flange portion 16e abuts the lower end opening edges of the inner tubular portion 11a and the outer tubular portion 11b of the first attachment member 11 via an annular upper sealing material 27. A lower surface of the flange portion 16e abuts an upper surface of the inner peripheral portion of the lower support portion 11c of the first attachment member 11 via an annular lower sealing material 28 that surrounds an upper end opening edge of the diaphragm 20 and an upper end opening edge of the diaphragm 20 from the outer side in the radial direction.

The partition member 16 includes an upper tubular body 31 and a lower tubular body 32 disposed so as to butt against each other in the axial direction and includes an upper wall 33 that blocks a lower end opening portion of the upper tubular body 31 and a lower wall 34 that blocks an upper end opening portion of the lower tubular body 32. In addition, the partition member 16 may be integrally formed.

The upper end opening edge of the upper tubular body 31 is the outer peripheral edge portion 16a of the aforementioned upper wall surface of the partition member 16. A flange portion 16e is formed at an upper end portion of the upper tubular body 31. A peripheral groove that is recessed upward and is open radially outward is formed at a portion of a lower end opening edge of the upper tubular body 31, which is located radially outside an inner peripheral portion of the lower end opening edge.

The upper wall 33 is fixed to the inner peripheral portion of the lower end opening edge of the upper tubular body 31. The upper wall 33 is formed with the first communication hole 42a.

A peripheral groove that is recessed downward is provided at a radially intermediate portion of the upper end opening edge of the lower tubular body 32, which faces the peripheral groove of the upper tubular body 31 in the axial direction. The orifice passage 24 is defined by this peripheral groove and the peripheral groove of the upper tubular body 31. An outer peripheral edge portion of the upper end opening edge of the lower tubular body 32, which is located radially outside the peripheral groove, abuts the lower surface of the flange portion 16e of the upper tubular body 31. The lower tubular body 32 is fitted into the upper end portion of the diaphragm 20, and the upper end portion of the diaphragm 20 is fitted into the lower support portion 11c of the first attachment member 11. Accordingly, the upper end portion of the diaphragm 20 is sandwiched in the radial direction between an outer peripheral surface of the lower tubular body 32 and an inner peripheral surface of the lower support portion 11c.

The lower wall 34 is fixed to the inner peripheral portion of the upper end opening edge of the lower tubular body 32. The lower wall 34 is formed with the second communication hole 42b.

At least one of the inner peripheral portion at the lower end opening edge of the upper tubular body 31 and the inner peripheral portion of the upper end opening edge of the lower tubular body 32 is formed with butting protrusions 34a and 34b that protrude toward and abut against toward the other. In the shown example, the butting protrusions 34a and 34b are formed on both the inner peripheral portion of the lower end opening edge of the upper tubular body 31 and the inner peripheral portion of the upper end opening edge of the lower tubular body 32. The butting protrusions 34a and 34b are formed in an annular shape disposed coaxially with the central axis O, and the upper wall 33 and the lower wall 34 are disposed radially inside the butting protrusions 34a and 34b with a gap in the axial direction from each other. The accommodation chamber 42 is defined by a lower surface of the upper wall 33, an upper surface of the lower wall 34, and inner peripheral surfaces of the butting protrusions 34a and 34b.

Also, in the present embodiment, a tubular member 21 that protrudes in the axial direction toward the elastic body 13 is disposed on the first wall surface 16b of the partition member 16 to which the first communication hole 42a is open and which constitutes a portion of the inner surface of the main liquid chamber 14.

The tubular member 21 is formed in a cylindrical shape and is disposed coaxially with the central axis O. The tubular member 21 extends straight in the axial direction. The axial length of the tubular member 21 is equal to or larger than 20% of the axial maximum height T of the main liquid chamber 14. In the shown example, the axial maximum height T of the main liquid chamber 14 is an axial distance between an upper end portion of the inner peripheral surface 13c of the elastic body 13, which extends radially inward from the bottom to the top, and the first wall surface 16b. The axial length of the tubular member 21 is set such that the upper end portion of the tubular member 21 does not abut against the inner peripheral surface 13c of the elastic body 13 when an axial static load is applied to the vibration-damping device 1 and when axial vibration is input.

In addition, as mentioned above, the inner peripheral surface 13c of the elastic body 13 is a portion that extends radially inward from the bottom to the top, and the upper end portion of the inner peripheral surface 13c of the elastic body 13 is an opening peripheral edge of a recessed portion of an inner surface of the elastic body 13 in a case where an upper end portion of the inner surface of the elastic body 13 that defines the main liquid chamber 14 is provided with a recessed portion that is recessed upward, as shown in the shown example.

An upper portion of the tubular member 21 protrudes upward from an upper end opening portion of the recessed portion formed on the upper wall surface of the partition member 16. An outer peripheral surface of the upper portion of the tubular member 21 radially faces a lower end portion of the inner peripheral surface of the inner tubular portion 11a of the first attachment member 11 and a lower end portion of the inner peripheral surface 13c of the elastic body 13. The protruding length of the upper portion of the tubular member 21 from the upper end opening portion of the recessed portion is shorter than the depth of the recessed portion. Additionally, the protruding length is shorter than an axial distance between the portion of the inner peripheral surface 13c of the elastic body 13 where an upper end opening edge of the tubular member 21 faces in the axial direction and the upper end opening edge of the tubular member 21. The upper end opening edge of the tubular member 21 faces a portion deviating downward from a central portion in a direction in which the inner peripheral surface 13c extends, in a vertical cross-sectional view in the axial direction, on the inner peripheral surface 13c of the elastic body 13 extending radially inward from the bottom to the top.

The radius of an inner peripheral surface of the tubular member 21 is larger than the radial distance between the outer peripheral surface of the tubular member 21 and the inner peripheral surface of the recessed portion formed on the upper wall surface of the partition member 16. The inner diameter of the tubular member 21 is equal to or larger than half of a maximum inner diameter R of the main liquid chamber 14. In the shown example, the maximum inner diameter R of the main liquid chamber 14 is the inner diameter of a lower end portion of the inner tubular portion 11a of the first attachment member 11. In the first wall surface 16b, the plane area of a portion 16f (hereinafter referred to as an inner portion) located inside the tubular member 21 is larger than the plane area of a portion 16g (hereinafter referred to as an outer portion) located outside the tubular member 21.

The plurality of first communication holes 42a are open to both the inner portion 16f and the outer portion 16g of the first wall surface 16b. All of the plurality of first communication holes 42a face an upper surface of the movable member 41.

The tubular member 21 is coupled to a portion of the first wall surface 16b located between adjacent first communication holes 42a and is disposed so as not to overlap the first communication hole 42a. The tubular member 21 is disposed such that the inner peripheral surface and the outer peripheral surface thereof are in contact with the first communication hole 42a when viewed from the axial direction.

One of the partition member 16 and the tubular member 21 may form the elasticity adjusting unit Z in which the elasticity of the elastic body 13 is made to be apparently different in the circumferential direction around the central axis O of the first attachment member 11. In the present embodiment, the partition member 16 that forms the elasticity adjusting unit Z will be described.

In the present embodiment, a plurality of first communication holes 42a are separately open to a first region X of the first wall surface 16b in the circumferential direction and a second region Y of the first wall surface 16b provided at a circumferential position different from the first region X.

Also, in the present embodiment, in the first wall surface 16b, the flow resistance of the liquid flowing through the first communication holes 42a that are open to the first region X in the circumferential direction and the flow resistance of the liquid flowing through the first communication holes 42a that are open to the second region Y in the circumferential direction are different from each other.

The first region X and the second region Y are provided at different circumferential positions. The first region X and the second region Y respectively include part of the inner portion 16f and part of the outer portion 16g. The plurality of first communication holes 42a are open to each of the first region X and the second region Y. The circumferential and radial sizes of the first region X are larger than the flow passage cross-sectional area of the first communication holes 42a that are open to the first region X. The circumferential and radial sizes of the second region Y are larger than the flow passage cross-sectional area of the first communication holes 42a that are open to the second region Y.

The proportion of the opening areas of the first communication holes 42a to the plane area of the first region X and the proportion of the opening areas of the first communication holes 42a to the plane area of the second region Y are different from each other. In the shown example, the proportion of the opening areas of the first communication holes 42a to the plane area of the first region X is larger than the proportion of the opening areas of the first communication holes 42a to the plane area of the second region Y.

The total sum of the opening areas of the first communication holes 42a that are open to the first region X is larger than the total sum of the opening areas of the first communication holes 42a that are open to the second region Y.

The plurality of first communication holes 42a that are open to the first region X are disposed with the same distances B and C over the entire region of the first region X. In the first region X, distances B and C between the first communication holes 42a adjacent to each other are smaller than the inner diameter of these first communication holes 42a. The plurality of first communication holes 42a that are open to the second region Y are disposed at equal intervals over the entire region of the second region Y. In the second region Y, distances D and E between the first communication holes 42a adjacent to each other are larger than the inner diameter of the first communication holes 42a.

The distances B and C between the first communication holes 42a adjacent to each other in the first region X and the distances D and E between the first communication holes 42a adjacent to each other in the second region Y are different from each other. In the shown example, the distances B and C between the first communication holes 42a adjacent to each other in the first region X are shorter than the distances D and E between the first communication holes 42a adjacent to each other in the second region Y.

In addition, the distances B and C between the first communication holes 42a adjacent to each other in the first region X may be set to be equal to or larger than the distances D and E between the first communication holes 42a adjacent to each other in the second region Y.

In the shown example, in each of the first region X and the second region Y, the plurality of first communication holes 42a are disposed with the same distances B and D in the circumferential direction, and the row of the first communication holes 42a arranged in the circumferential direction in this way is disposed concentrically around the central axis O with the same distances C and E in the radial direction. In the first region X, the circumferential distance B and the radial distance C are the same as each other. In the second region Y, the circumferential distance D and the radial distance E are the same as each other.

In addition, in the first region X, the circumferential distance B and the radial distance C may be different from each other. In the second region Y, the circumferential distance D and the radial distance E may be different from each other.

The flow passage cross-sectional area of the first communication holes 42a that are open to the first region X and the flow passage cross-sectional area of the first communication holes 42a that are open to the second region Y are different from each other. The flow passage cross-sectional area of each first communication hole 42a is the same over the entire length in the axial direction.

In addition, the flow passage cross-sectional area of each first communication hole 42a may be different depending on axial positions. In this case, the flow passage cross-sectional area of the first communication hole 42a can be represented by the average value of flow passage cross-sectional areas at a plurality of positions in the axial direction.

In the present embodiment, the flow passage cross-sectional area of the first communication holes 42a that are open to the first region X is larger than the flow passage cross-sectional area of the first communication holes 42a that are open to the second region Y. Accordingly, the flow resistance of the liquid flowing through the first communication holes 42a that are open to the second region Y is higher than the flow resistance of the liquid flowing through the first communication holes 42a that are open to the first region X. In the first region X, the flow resistances of the liquids flowing through the plurality of first communication holes 42a are the same as each other. In the second region Y, the flow resistances of the liquids flowing through the plurality of first communication holes 42a are the same as each other.

Here, the thicknesses of the upper wall 33 and the lower wall 34 are the same over the entire region, and the flow passage length of the first communication holes 42a that are open to the first region X and the flow passage lengths of the first communication holes 42a that are open to the second region Y are the same as each other.

When viewed from the axial direction, the first regions X are separately provided at positions facing each other across the central axis O in one direction, and the second regions Y are separately provided at positions facing each other across the central axis O in the other direction orthogonal to the one direction.

The first region X and the second region Y are provided in the entire region of the first wall surface 16b. The circumferential sizes of the first region X and the second region Y are the same as each other. The plane areas of the first region X and the second region Y are the same as each other. Each of the first region X and the second region Y is provided in an angular range of about 90° about the central axis O on the first wall surface 16b. The first region X and the second region Y are provided alternately in the circumferential direction. The first region X and the second region Y have a fan shape when viewed from the axial direction. In addition, the first region X and the second region Y may have, for example, a quadrangular shape when viewed from the axial direction.

In the vibration-damping device 1 having such a configuration, when idle vibration having a relatively high frequency in the low frequency vibration is input in the axial direction, the movable member 41 is deformed or displaced in the accommodation chamber 42 and the liquid in the liquid chamber 19 flows through the first communication holes 42a and the second communication holes 42b, so that this vibration is damped and absorbed. Additionally, when the shake vibration having a relatively low frequency in the low frequency vibration is input in the axial direction, this vibration is damped and absorbed by the liquid in the liquid chamber 19 flowing through the orifice passage 24.

As described above, according to the vibration-damping device 1 according to the present embodiment, the tubular member 21 protruding toward the elastic body 13 is disposed on the first wall surface 16b of the partition member 16. Thus, when the elastic body 13 is deformed in a secondary vibration mode in a vertical cross-sectional view in the axial direction due to the input of medium frequency vibration in the axial direction, a node portion generated at a central portion of the elastic body 13 in the related art deviates to the second attachment member 12 side due to, for example, the fact that it is difficult for the liquid between the inner peripheral surface of the main liquid chamber 14 and the outer peripheral surface of the upper portion of the tubular member 21 to flow. As a result, in the elastic body 13, a portion located closer to the first attachment member 11 side than the node portion is more easily deformed than a portion located closer to the second attachment member 12 side than the node portion. Accordingly, when the medium frequency vibration in the axial direction is input, the portion of the elastic body 13 located closer to the first attachment member 11 side than the node portion is positively deformed, it is possible to apparently reduce the stiffness of the elastic body 13, and this vibration can be damped and absorbed.

Additionally, since the plurality of first communication holes 42a are open to both the inner portion 16f and the outer portion 16g of the first wall surface 16b, it is possible to dispose many first communication holes 42a in the first wall surface 16b, and, for example, the idle vibration having a relatively high frequency in the low frequency vibration can be reliably damped and absorbed.

Additionally, in the first wall surface 16b, the flow resistance of the liquid flowing through the first communication holes 42a that are open to the first region X in the circumferential direction and the flow resistance of the liquid flowing through the first communication holes 42a that are open to the second region Y in the circumferential direction are different from each other. Thus, when the vibration in the orientation in which the first region X is located with respect to the central axis O in the lateral direction intersecting the axial direction is input and when the vibration in the orientation in which the second region Y is located is input, the first communication holes 42a through which a relatively large amount of liquid flows among the plurality of first communication holes 42a change. Accordingly, the degree of liquid flow in the entire liquid chamber 19 can be made different. Accordingly, when the vibration in the orientation in which the first region X is located with respect to the central axis O in the lateral direction is input and when the vibration in the orientation in which the second region Y is located is input, the elasticities of the vibration-damping device 1 to be developed can be made different from each other. That is, in the tubular member 21 that forms the elasticity adjusting unit Z, it is possible to apparently make the stiffness of the elastic body 13 different in the circumferential direction around the central axis O of the first attachment member 11, that is, it is possible to apparently make the elasticity of the elastic body 13 different. Accordingly, for example, tuning can be easily performed even in a case where the positions of the elasticities of the elastic body 13 and the node portions are different in the front-rear direction and the left-right direction in the radial direction.

In addition, the elasticities of the elastic body 13 may be made different from each other, for example, by making the thicknesses or lengths of the elastic body 13 different from each other in the front-rear direction and the left-right direction.

In the shown example, the flow resistance in the first region X is lower than the flow resistance in the second region Y. Thus, the elasticity of the vibration-damping device 1 to be developed when the vibration in the orientation in which the first region X is located with respect to the central axis O in the lateral direction is input is lower than the elasticity of the vibration-damping device 1 to be developed when the vibration in the orientation in which the second region Y is located with respect to the central axis O in the lateral direction is input.

Additionally, by designing the first communication holes 42a formed in the first wall surface 16b instead of the tubular member 21 protruding from the first wall surface 16b, it is possible to make the elasticity of the vibration-damping device 1 to be developed different when the vibration in the orientation in which the first region X is located with respect to the central axis O in the lateral direction is input and when the vibration in the orientation in which the second region Y is located is input. Thus, design restrictions can be less likely to be caused compared to a case where such working effects are provided by designing the tubular member 21.

The flow passage cross-sectional area of the first communication holes 42a that are open to the first region X and the flow passage cross-sectional area of the first communication holes 42a that are open to the second region Y are different from each other. Thus, the flow resistance of the liquid flowing through the former first communication holes 42a and the flow resistance of the liquid flowing through the latter first communication holes 42a can be reliably made different from each other.

The flow passage cross-sectional area of the first communication holes 42a that are open to the first region X and the flow passage cross-sectional area of the first communication holes 42a that are open to the second region Y are different from each other. Thus, the proportion of the opening areas of the first communication holes 42a to the plane area of the first region X and the proportion of the opening areas of the first communication holes 42a to the plane area of the second region Y can be reliably made different from each other.

Additionally, the proportion of the opening areas of the first communication holes 42a to the plane area of the first region X and the proportion of the opening areas of the first communication holes 42a to the plane area of the second region Y can be made different from each other. Thus, when the vibration in the orientation in which the first region X is located with respect to the central axis O in the lateral direction is input and when the vibration in the orientation in which the second region Y is located is input, the first communication holes 42a through which a relatively large amount of liquid flows among the plurality of first communication holes 42a change. Accordingly, the degree of liquid flow in the entire liquid chamber 19 can be made different.

Accordingly, when the vibration in the orientation in which the first region X is located with respect to the central axis O in the lateral direction is input and when the vibration in the orientation in which the second region Y is located is input, the elasticities of the vibration-damping device 1 to be developed can be made different from each other. Accordingly, for example, tuning can be easily performed even in a case where the positions of the elasticities of the elastic body 13 and the node portions are different in the front-rear direction and the left-right direction in the radial direction.

In addition, the elasticities of the elastic body 13 may be made different from each other, for example, by making the thicknesses or lengths of the elastic body 13 different from each other in the front-rear direction and the left-right direction.

In the shown example, the proportion in the first region X is larger than the proportion in the second region Y. Thus, the elasticity of the vibration-damping device 1 to be developed when the vibration in the orientation in which the first region X is located with respect to the central axis O in the lateral direction is input is lower than the elasticity of the vibration-damping device 1 to be developed when the vibration in the orientation in which the second region Y is located with respect to the central axis O in the lateral direction is input.

When viewed from the axial direction, the first regions X are separately provided at positions facing each other across the central axis O in one direction, and the second regions Y are separately provided at positions facing each other across the central axis O in the other direction orthogonal to the one direction. Accordingly, when the vibration in the orientation in which the first region X is located with respect to the central axis O in the lateral direction is input and when the vibration in the orientation in which the second region Y is located is input, the elasticities of the vibration-damping device 1 to be developed can be reliably made different from each other.

The distances B and C between the first communication holes 42a adjacent to each other in the first region X and the distances D and E between the first communication holes 42a adjacent to each other in the second region Y are different from each other. Thus, the proportion of the opening areas of the first communication holes 42a to the plane area of the first region X and the proportion of the opening areas of the first communication holes 42a to the plane area of the second region Y can be reliably made different from each other.

Additionally, since the axial length of the tubular member 21 is equal to or larger than 20% of the axial maximum height T of the main liquid chamber 14, the medium frequency vibration in the axial direction can be reliably damped and absorbed.

Additionally, since the inner diameter of the tubular member 21 is equal to or larger than half of the maximum inner diameter R of the main liquid chamber 14, the medium frequency vibration in the axial direction can be reliably damped and absorbed.

Second Embodiment

Next, a second embodiment according to the present invention will be described, but the basic configuration thereof is the same as that of the first embodiment. For this reason, the same reference numerals are given to the same components, the description thereof will be omitted, and only different points will be described.

Also in the present embodiment, the partition member 16 that forms the elasticity adjusting unit Z will be described.

Figure 3:
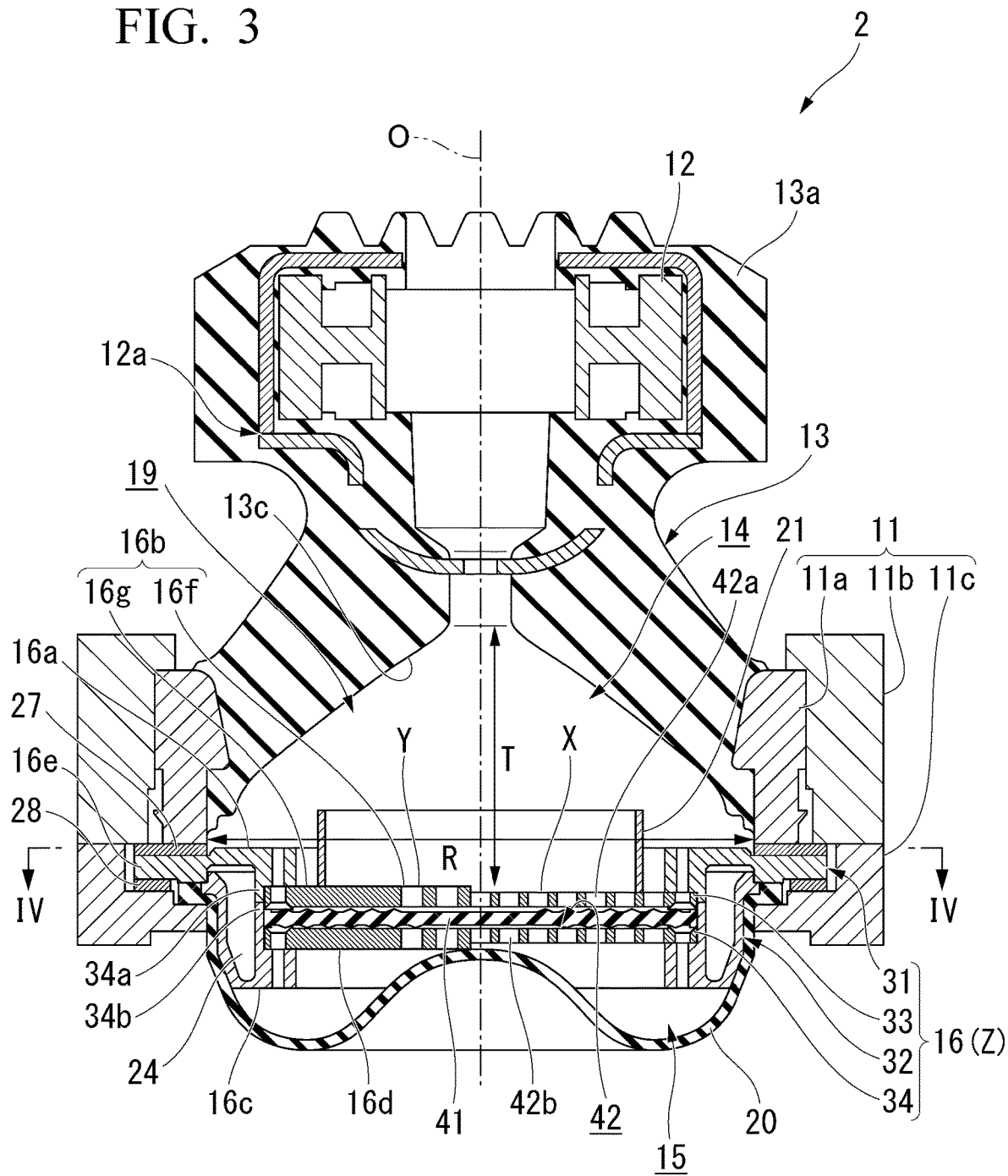
FIG. 3 is a longitudinal sectional view of a vibration-damping device according to a second embodiment of the present invention.

In the vibration-damping device 2 according to the present embodiment, as shown in FIG. 3, the flow passage length of the first communication holes 42a that are open to the first region X and the flow passage length of the first communication holes 42a that are open to the second region Y are different from each other. Accordingly, the flow resistance of the liquid flowing through the first communication holes 42a that are open to the first region X and the flow resistance of the liquid flowing through the first communication holes 42a that are open to the second region Y are different from each other.

In the present embodiment, the flow passage length of the first communication holes 42a that are open to the second region Y is larger than the flow passage length of the first communication holes 42a that are open to the first region X. Accordingly, the flow resistance of the liquid flowing through the first communication holes 42a that are open to the second region Y is higher than the flow resistance of the liquid flowing through the first communication holes 42a that are open to the first region X.

In the shown example, in each of the upper wall 33 and the lower wall 34, the thickness of a portion extending in the circumferential direction where the second region Y is located is larger than the thickness of a portion extending in the circumferential direction where the first region X is located. Accordingly, the flow passage length of the first communication holes 42a that are open to the second region Y is larger than the flow passage length of the first communication holes 42a that are open to the first region X.

A lower surface of the upper wall 33 and an upper surface of the lower wall 34 are flat over the entire region. In each of the upper wall 33 and the lower wall 34, the thicknesses of the portions extending in the circumferential direction in which the second region Y is located are the same as each other. In each of the upper wall 33 and the lower wall 34, the thicknesses of the portions extending in the circumferential direction in which the first region X is located are the same as each other.

In the first wall surface 16b, the second region Y is located above the first region X. The portion, which is located in the first region X, in a lower end opening edge of the tubular member 21, is located below the portion located in the second region Y. The lower end opening edge of the tubular member 21 abuts the first wall surface 16b over the entire length in the circumferential direction.

Figure 4:
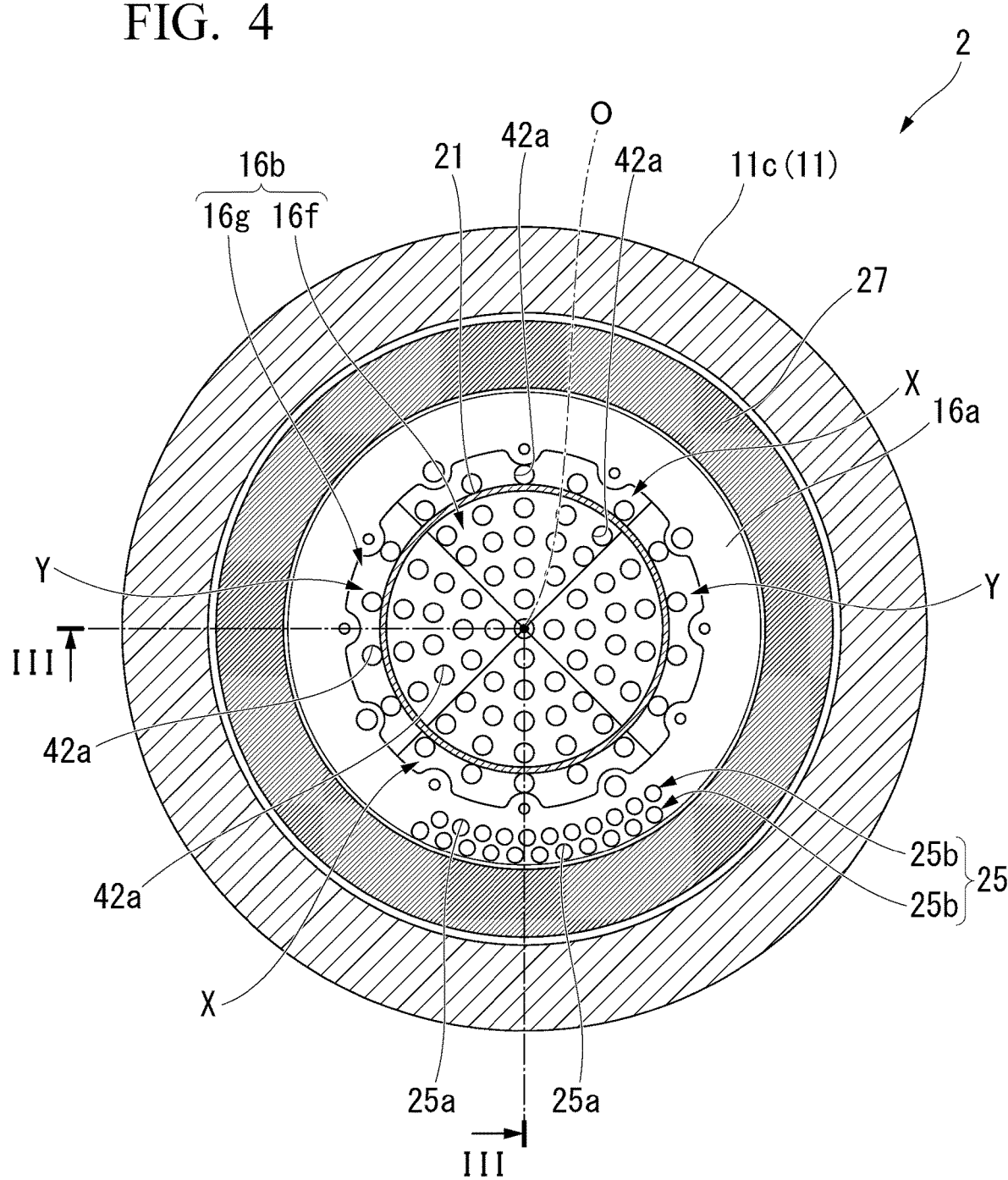
FIG. 4 is a cross-sectional view, taken along arrow line IV-IV, of the vibration-damping device shown in FIG. 3.

As shown in FIG. 4, the flow passage cross-sectional area of the first communication holes 42a that are open to the first region X and the flow passage cross-sectional area of the first communication holes 42*a* that are open to the second region Y are the same as each other.

Regarding all of the plurality of first communication holes 42*a* that are open to the first wall surface 16*b*, the distances between the first communication holes 42*a* adjacent to each other are the same as each other.

The proportion of the opening areas of the first communication holes 42*a* to the plane area of the first region X and the proportion of the opening areas of the first communication holes 42*a* to the plane area of the second region Y are the same as each other. The total sum of the opening areas of the first communication holes 42*a* that are open to the first region X and the total sum of the opening areas of the first communication holes 42*a* that are open to the second region Y are the same as each other.

According to the vibration-damping device 2 according to the present embodiment, the flow passage length of the first communication holes 42*a* that are open to the first region X and the flow passage length of the first communication holes 42*a* that are open to the second region Y are different from each other. Thus, the flow resistance of the liquid flowing through the former first communication holes 42*a* and the flow resistance of the liquid flowing through the latter first communication holes 42*a* can be reliably made different from each other, and the same working effects as that of the vibration-damping device 1 according to the first embodiment are provided.

A vibration-damping device according to a first aspect of the present invention is vibration-damping device including a tubular first attachment member that is coupled to any one of a vibration generating part and a vibration receiving part, and a second attachment member that is coupled to the other thereof; an elastic body that elastically couples both the first and second attachment members to each other; a partition member that partitions a liquid chamber in the first attachment member in which a liquid is enclosed into a main liquid chamber having the elastic body as a portion of a partition wall in an axial direction and an auxiliary liquid chamber along a central axis of the first attachment member; and a movable member that is deformably or displaceably accommodated in an accommodation chamber provided in the partition member. The partition member is provided with an orifice passage that allows the main liquid chamber and the auxiliary liquid chamber to communicate with each other, a plurality of first communication holes that allow the main liquid chamber and the accommodation chamber to communicate with each other, and a second communication hole that allows the auxiliary liquid chamber and the accommodation chamber to communicate with each other. A tubular member that protrudes in the axial direction toward the elastic body is disposed on a first wall surface of the partition member to which the first communication hole is open and which constitutes a portion of an inner surface of the main liquid chamber. The plurality of first communication holes are open to both an inner portion located inside the tubular member and an outer portion located outside the tubular member, on the first wall surface. One of the partition member and the tubular member forms an elasticity adjusting unit in which an elasticity of the elastic body is made to be apparently different in a circumferential direction around the central axis.

According to the vibration-damping device of one aspect of the present invention, the tubular member protruding toward the elastic body is disposed on the first wall surface of the partition member. Thus, when the elastic body is deformed in a secondary vibration mode in a vertical cross-sectional view in the axial direction due to the input of medium frequency vibration in the axial direction, a node portion generated at a central portion of the elastic body in the related art deviates to the second attachment member side due to, for example, the fact that it is difficult for the liquid between the inner peripheral surface of the main liquid chamber and the outer peripheral surface of the tubular member to flow. As a result, in the elastic body, a portion located closer to the first attachment member side than the node portion is more easily deformed than a portion located closer to the second attachment member side than the node portion. Accordingly, when the medium frequency vibration in the axial direction is input, the portion of the elastic body located closer to the first attachment member side than the node portion is positively deformed, it is possible to reduce the stiffness of the elastic body is apparently reduced, and this vibration can be damped and absorbed.

Additionally, since the plurality of first communication holes are open to both the inner portion located inside the tubular member and the outer portion located outside the tubular member on the first wall surface, it is possible to dispose many first communication holes in the first wall surface, and, for example, idle vibration having a relatively high frequency in the low frequency vibration can be reliably damped and absorbed.

Additionally, since one of the partition member and the tubular member forms the elasticity adjusting unit that makes the elasticity of the elastic body apparently different in the circumferential direction along the central axis, the elasticities of the elastic body can be apparently made different in the circumferential direction around the central axis.

In the partition member that forms the elasticity adjusting unit, a flow resistance of a liquid flowing through the first communication holes that are open to a first region in the circumferential direction around the central axis in the first wall surface and a flow resistance of a liquid flowing through the first communication holes that are open to a second region in the circumferential direction in the first wall surface may be different from each other.

In this case, in the partition member that forms the elasticity adjusting unit, in the first wall surface, the flow resistance of the liquid flowing through the first communication holes that are open to the first region in the circumferential direction and the flow resistance of the liquid flowing through the first communication holes that are open to the second region in the circumferential direction are different from each other. Thus, when the vibration in the orientation in which the first region is located with respect to the central axis in the lateral direction intersecting the axial direction is input and when the vibration in the orientation in which the second region is located is input, the first communication holes through which a relatively large amount of liquid flows among the plurality of first communication holes change. Accordingly, the degree of liquid flow in the entire liquid chamber can be made different. Accordingly, when the vibration in the orientation in which the first region is located with respect to the central axis in the lateral direction is input and when the vibration in the orientation in which the second region is located is input, the elasticities of the vibration-damping device 1 to be developed can be made different from each other. Accordingly, for example, tuning can be easily performed even in a case where the positions of the elasticities of the elastic body and the node portions are different in the front-rear direction and the left-right direction in the radial direction.

Additionally, by designing the first communication holes formed in the first wall surface instead of the tubular member protruding from the first wall surface, it is possible to make the elasticity of the vibration-damping device to be developed different when the vibration in the orientation in which the first region is located with respect to the central axis in the lateral direction is input and when the vibration in the orientation in which the second region is located is input. Thus, design restrictions can be less likely to be caused compared to a case where such working effects are provided by designing the tubular member.

The flow passage cross-sectional area of the first communication holes that are open to the first region and the flow passage cross-sectional area of the first communication holes that are open to the second region may be different from each other.

In this case, the flow passage cross-sectional area of the first communication holes that are open to the first region and the flow passage cross-sectional area of the first communication holes that are open to the second region are different from each other. Thus, the flow resistance of the liquid flowing through the former first communication holes and the flow resistance of the liquid flowing through the latter first communication holes can be reliably made different from each other.

The flow passage length of the first communication holes that are open to the first region and the flow passage length of the first communication holes that are open to the second region may be different from each other.

In this case, the flow passage length of the first communication holes that are open to the first region and the flow passage length of the first communication holes that are open to the second region are different from each other. Thus, the flow resistance of the liquid flowing through the former first communication holes and the flow resistance of the liquid flowing through the latter first communication holes can be reliably made different from each other.

A proportion of opening areas of the first communication holes to a plane area of the first region and a proportion of the opening areas of the first communication holes to a plane area of the second region may be made different from each other.

In this case, the proportion of the opening areas of the first communication holes to a plane area of the first region and the proportion of the opening areas of the first communication holes to the plane area of the second region may be made different from each other. Thus, when the vibration in the orientation in which the first region is located with respect to the central axis in the lateral direction is input and when the vibration in the orientation in which the second region is located is input, the first communication holes through which a relatively large amount of liquid flows among the plurality of first communication holes change. Accordingly, the degree of liquid flow in the entire liquid chamber can be made different.

When viewed from the axial direction, the first regions may be separately provided at positions facing each other across the central axis in one direction, and the second regions may be separately provided at positions facing each other across the central axis in the other direction orthogonal to the one direction.

In this case, when viewed from the axial direction, the first regions are separately provided at positions facing each other across the central axis in one direction, and the second regions are separately provided at positions facing each other across the central axis in the other direction orthogonal to the one direction. Accordingly, when the vibration in the orientation in which the first region is located with respect to the central axis in the lateral direction is input and when the vibration in the orientation in which the second region is located is input, the elasticities of the vibration-damping device to be developed can be reliably made different from each other.

In the partition member forming the elasticity adjusting unit, a plurality of the first communication holes are separately open to the first region of the first wall surface in the circumferential direction around the central axis and the second region provided at a circumferential position different from the first region, and the proportion of the opening areas of the first communication holes to the plane area of the first region and the proportion of the opening areas of the first communication holes to the plane area of the second region may be made different from each other.

In this case, in the partition member that forms the elasticity adjusting unit, in the first wall surface, the proportion of the opening areas of the first communication holes to the plane area of the first region and the proportion of the opening areas of the first communication holes to the plane area of the second region on the first wall surface are different from each other. Thus, when the vibration in the orientation in which the first region is located with respect to the central axis in the lateral direction intersecting the axial direction is input and when the vibration in the orientation in which the second region is located is input, the first communication holes through which a relatively large amount of liquid flows among the plurality of first communication holes change. Accordingly, the degree of liquid flow in the entire liquid chamber can be made different. Accordingly, when the vibration in the orientation in which the first region is located with respect to the central axis in the lateral direction is input and when the vibration in the orientation in which the second region is located is input, the elasticities of the vibration-damping device 1 to be developed can be made different from each other. Accordingly, for example, tuning can be easily performed even in a case where the positions of the elasticities of the elastic body and the node portions are different in the front-rear direction and the left-right direction in the radial direction.

Additionally, by designing the first communication holes formed in the first wall surface instead of the tubular member protruding from the first wall surface, it is possible to make the elasticity of the vibration-damping device to be developed different when the vibration in the orientation in which the first region is located with respect to the central axis in the lateral direction is input and when the vibration in the orientation in which the second region is located is input. Thus, design restrictions can be less likely to be caused compared to a case where such working effects are provided by designing the tubular member.

The flow passage cross-sectional area of the first communication holes that are open to the first region and the flow passage cross-sectional area of the first communication holes that are open to the second region may be different from each other.

In this case, the flow passage cross-sectional area of the first communication holes that are open to the first region and the flow passage cross-sectional area of the first communication holes that are open to the second region are different from each other. Thus, the proportion of the opening areas of the first communication holes to the plane area of the first region and the proportion of the opening areas of the first communication holes to the plane area of the second region can be reliably made different from each other.

The distance between the first communication holes adjacent to each other in the first region and the distance between the first communication holes adjacent to each other in the second region may be different from each other.

In this case, the distance between the first communication holes adjacent to each other in the first region and the distance between the first communication holes adjacent to each other in the second region are different from each other. Thus, the proportion of the opening areas of the first communication holes to the plane area of the first region and the proportion of the opening areas of the first communication holes to the plane area of the second region can be reliably made different from each other.

When viewed from the axial direction, the first regions may be separately provided at positions facing each other across the central axis in one direction, and the second regions may be separately provided at positions facing each other across the central axis in the other direction orthogonal to the one direction.

In this case, when viewed from the axial direction, the first regions are separately provided at positions facing each other across the central axis in one direction, and the second regions are separately provided at positions facing each other across the central axis in the other direction orthogonal to the one direction. Accordingly, when the vibration in the orientation in which the first region is located with respect to the central axis in the lateral direction is input and when the vibration in the orientation in which the second region is located is input, the elasticities of the vibration-damping device to be developed can be reliably made different from each other.

In addition, the technical scope of the invention is not limited to the above embodiment, and various changes can be made without departing the spirit of the invention.

For example, in the first embodiment, with the proportion of the opening areas of the first communication holes 42a to the plane area of the second region Y kept smaller than the proportion of the opening areas of the first communication holes 42a to the plane area of the first region X, the flow resistance of the liquid flowing through the first communication holes 42a that are open to the second region Y may be set to be equal to or less than the flow resistance of the liquid flowing through the first communication holes 42a that are open to the first region X.

In the first embodiment, with the proportion of the opening areas of the first communication holes 42a to the plane area of the second region Y kept smaller than the proportion of the opening areas of the first communication holes 42a to the plane area of the first region X, the flow passage cross-sectional area of the liquid flowing through the first communication holes 42a that are open to the second region Y may be set to be equal to or more than the flow passage cross-sectional area of the liquid flowing through the first communication holes 42a that are open to the first region X.

For example, in the first embodiment, with the proportion of the opening areas of the first communication holes 42a to the plane area of the second region Y kept smaller than the proportion of the opening areas of the first communication holes 42a to the plane area of the first region X, the flow resistance of the liquid flowing through the first communication holes 42a that are open to the second region Y may be lower than the flow resistance of the liquid flowing through the first communication holes 42a that are open to the first region X.

In the first embodiment, the flow passage length of the first communication holes 42a that are open to the first region X and the flow passage length of the first communication holes 42a that are open to the second region Y may be made different from each other, and, for example, the flow passage length of the first communication holes 42a that are open to the first region X may be shorter than the flow passage length of the first communication holes 42a that are open to the second region Y.

In the first embodiment, with the flow resistance of the liquid flowing through the first communication holes 42a that are open to the first region X kept lower than the flow resistance of the liquid flowing through the first communication holes 42a that are open to the second region Y, the total sum of the opening areas of the first communication holes 42a that are open to the first region X may be set to be equal to or less than the total sum of the opening areas of the first communication holes 42a that are open to the second region Y, and the proportion of the opening areas of the first communication holes 42a to the plane area of the first region X may be equal to or less than the proportion of the opening areas of the first communication holes 42a to the plane area of the second region Y.

In the first embodiment, with the flow resistance of the liquid flowing through the first communication holes 42a that are open to the first region X kept lower than the flow resistance of the liquid flowing through the first communication holes 42a that are open to the second region Y, the total sum of the opening areas of the first communication holes 42a that are open to the first region X may be set to be equal to or less than the total sum of the opening areas of the first communication holes 42a that are open to the second region Y, and the proportion of the opening areas of the first communication holes 42a to the plane area of the first region X may be smaller than the proportion of the opening areas of the first communication holes 42a to the plane area of the second region Y.

In the second embodiment, the flow passage cross-sectional area of the first communication holes 42a that are open to the first region X and the flow passage cross-sectional area of the first communication holes 42a that are open to the second region Y may be made different from each other. In the second embodiment, the proportion of the opening areas of the first communication holes 42a to the plane area of the second region Y and the proportion of the opening areas of the first communication holes 42a to the plane area of the first region X may be made different from each other.

In the second embodiment, the total sum of the opening areas of the first communication holes 42a that are open to the first region X and the total sum of the opening areas of the first communication holes 42a that are open to the second region Y may be made different from each other.

The flow resistance of the first communication holes 42a that are open to the first region X may be as high as that of the first communication hole 42a located on the second region Y side.

The flow resistance of the first communication holes 42a that are open to the second region Y may be as low as the first communication holes 42a located on the first region X side.

The plane areas of the first region X and the second region Y may be different from each other.

The number of first regions X and the number of second regions Y is not limited to the above embodiment and may be appropriately changed. The positions of the first region X and the second region Y are not limited to those of the above embodiment and, for example, the positions of the first region X and the second region Y may be appropriately changed, such as separately providing the first region X and the second region Y at positions facing each other across the central axis O in one direction when viewed from the axial direction.

The first wall surface 16b is not limited to the first region X and the second region Y, and may include another region to which first communication holes having a liquid flow resistance different from that of the first communication holes 42a that are open to the first region X and the second region Y are open.

In each of the first region X and the second region Y, some of the first communication holes 42a having a liquid flow resistance different from that of the other first communication holes 42a may be included in the plurality of first communication holes 42a formed. For example, some of the first communication holes 42a having a higher flow resistance, which are formed in the second region Y, may be included in the plurality of first communication holes 42a formed in the first region X. Some of the first communication holes 42a having a lower flow resistance, which are formed in the first region X, may be included in the plurality of first communication holes 42a formed in the second region Y.

Additionally, although a configuration in which the tubular member 21 is coupled to the first wall surface 16b so as not to overlap the first communication holes 42a is shown, the tubular member 21 may be coupled to the first wall surface 16b so as to overlap the first communication holes 42a.

Additionally, although a configuration formed in a tubular shape extending in the axial direction is shown as the elastic body 13, a configuration formed in an annular plate shape having upper and lower surfaces may be adopted.

Additionally, although the recessed portion is formed on the upper wall surface of the partition member 16, the recessed portion may not be formed.

Additionally, in the above embodiments, the compression type vibration-damping devices 1 and 2 in which the positive pressure acts on the main liquid chamber 14 as the support load acts has been described. However, the present invention is also applicable to a hanging-type vibration-damping device that is attached such that the main liquid chamber 14 is located on the lower side in the vertical direction and the auxiliary liquid chamber 15 is located on the upper side in the vertical direction and in which the negative pressure acts on the main liquid chamber 14 as the support load acts.

Additionally, the vibration-damping device 1 or 2 according to the present invention is not limited to an engine mount of a vehicle and can also be applied to those other than the engine mount. For example, the vibration-damping devices are applicable to mounts of power generators loaded on construction machines or are applicable to mounts of machines installed in factories or the like.

In addition, it is possible to appropriately replace the constituent elements in the above embodiments with well-known constituent elements without departing from the spirit of the present invention. Additionally, the above embodiments and modification examples may be appropriately combined.

Third Embodiment

Hereinafter, a third embodiment of a vibration-damping device according to the present invention will be described with reference to FIGS. 5 and 6.

Figure 5:
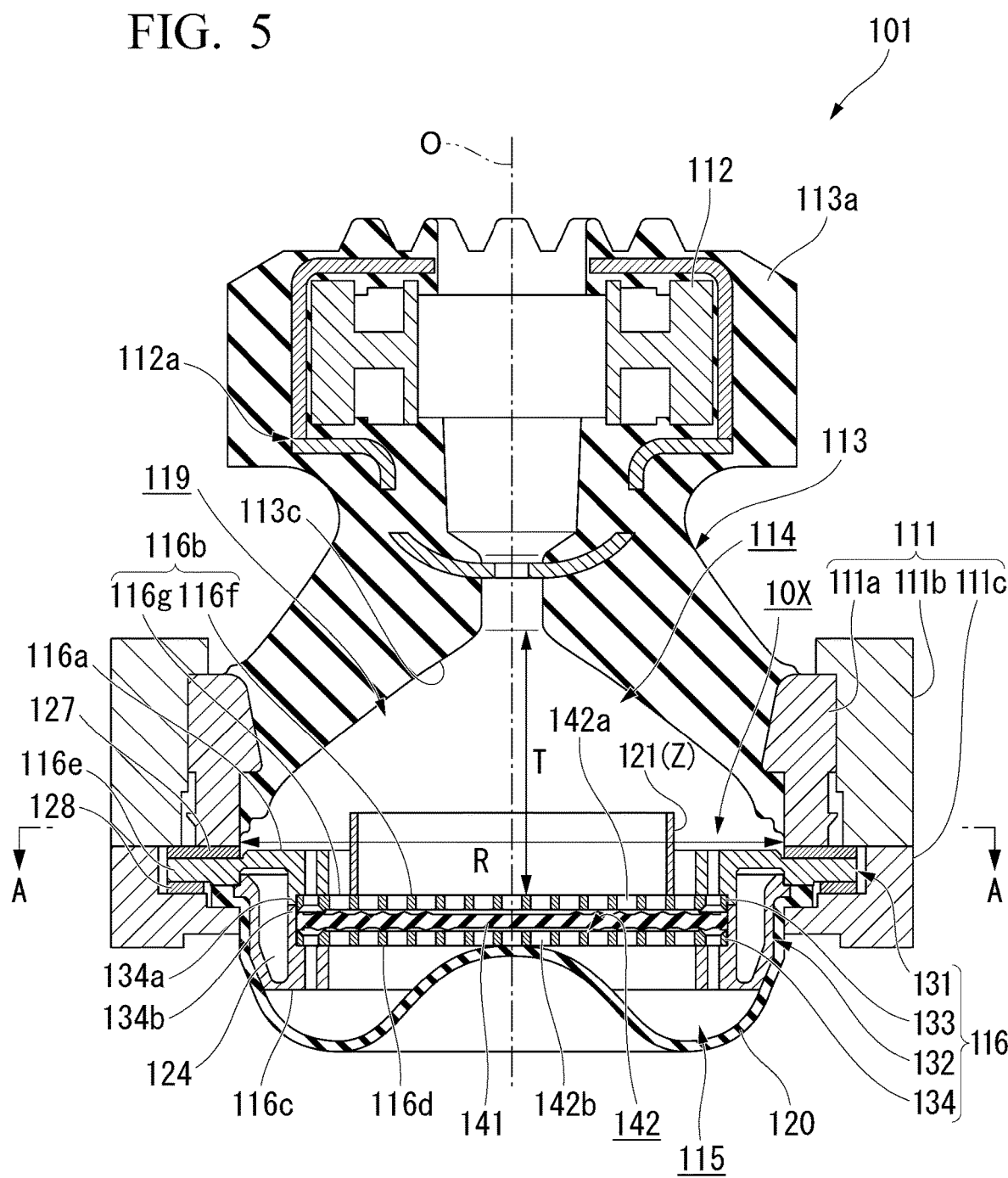
FIG. 5 is a longitudinal sectional view of a vibration-damping device according to a third embodiment of the present invention.

As shown in FIG. 5, the vibration-damping device 101 is a liquid-enclosed type vibration-damping device including a tubular first attachment member 111 that is coupled to any one of a vibration generating part and a vibration receiving part, a second attachment member 112 that is coupled to the other of the vibration generating part and the vibration receiving part, an elastic body 113 that elastically couples the first attachment member 111 and the second attachment member 112 to each other, a partition member 116 that partitions a liquid chamber 119 within the first attachment member 111 in which a liquid is enclosed into a main liquid chamber 114 having an elastic body 113 as a portion of a partition wall and an auxiliary liquid chamber 115, and a movable member 141 that is deformably or displaceably accommodated in an accommodation chamber 142 provided in the partition member 116.

Hereinafter, a direction along a central axis O of the first attachment member 111 is referred to as an axial direction. Additionally, the second attachment member 112 side in the axial direction is referred to as an upper side, and the partition member 116 side is referred to as a lower side. Additionally, in a plan view of the vibration-damping device 101 viewed from the axial direction, a direction intersecting the central axis O is referred to as a radial direction, and a direction around the central axis O is referred to as a circumferential direction.

In addition, the first attachment member 111, the second attachment member 112, and the elastic body 113 each have a circular shape or an annular shape in a plan view and are disposed coaxially with the central axis O.

In a case where the vibration-damping device 101 is mounted on, for example, an automobile, the second attachment member 112 is coupled to an engine or the like serving as the vibration generating part, and the first attachment member 111 is coupled to a vehicle body serving as the vibration receiving part. Accordingly, the transmission of vibration of the engine or the like to the vehicle body is suppressed. In addition, the first attachment member 111 may be coupled to the vibration generating part, and the second attachment member 112 may be coupled to the vibration receiving part.

The first attachment member 111 includes an inner tubular portion 111a, an outer tubular portion 111b, and a lower support portion 111c. The inner tubular portion 111a is fitted into the outer tubular portion 111b. The lower support portion 111c is formed in an annular shape. A lower end opening edge of the outer tubular portion 111b is placed on an upper surface of an outer peripheral portion of the lower support portion 111c. The first attachment member 111 is formed in a cylindrical shape as a whole. The first attachment member 111 is coupled to the vehicle body or the like serving as the vibration receiving part via a bracket that is not shown.

The second attachment member 112 is located radially inside and above the first attachment member 111. The outer diameter of the second attachment member 112 is smaller than the inner diameter of the first attachment member 111. The second attachment member 112 is coupled to an engine or the like serving as the vibration generating part via an attachment metal fitting by fitting an attachment metal fitting (that is not shown) inside.

In addition, the relative positions of the first attachment member 111 and the second attachment member 112 are not limited to the shown example and may be appropriately changed. Additionally, the outer diameter of the second attachment member 112 may be equal to or larger than the inner diameter of the first attachment member 111.

The elastic body 113 is formed in a tubular shape that extends in the axial direction. The diameter of the elastic body 113 increases downward from above.

The first attachment member 111 and the second attachment member 112 are separately coupled to both end portions of the elastic body 113 in the axial direction. The second attachment member 112 is coupled to an upper end portion of the elastic body 113, and the first attachment member 111 is coupled to a lower end portion of the elastic body 113. The elastic body 113 blocks an upper end opening portion of the first attachment member 111. The lower end portion of the elastic body 113 is coupled to an inner peripheral surface of the inner tubular portion 111a of the first attachment member 111. An upper end portion of the elastic body 113 is coupled to a lower surface of the second attachment member 112. The elastic body 113 is formed of a rubber material or the like and is vulcanized and bonded to the first attachment member 111 and the second attachment member 112. The thickness of the elastic body 113 becomes smaller downward from above. In addition, the elastic body 113 may be formed of, for example, a synthetic resin material or the like.

A stopper rubber 113a that covers an outer peripheral surface and an upper surface of the second attachment member 112 is integrally formed at the upper end portion of the elastic body 113. An outer shell body 112a surrounding the second attachment member 112 is buried in the elastic body 113 and the stopper rubber 113a.

The diaphragm 120 is made of elastic materials, such as rubber or soft resin, and is formed in a bottomed cylindrical shape. As an upper end portion of the diaphragm 120 is sandwiched between an inner peripheral portion of the lower support portion 111c of the first attachment member 111 and an outer peripheral portion of the partition member 116, the liquid-tightness inside the diaphragm 120 is ensured, and a lower end opening portion of the first attachment member 111 is blocked.

In addition, in the shown example, a bottom portion of the diaphragm 120 has a shape that is deep on an outer peripheral side thereof and shallow at a central portion thereof. However, as the shape of the diaphragm 120, various shapes known in the related art can be adopted in addition to such a shape.

As the diaphragm 120 blocks the lower end opening portion of the first attachment member 111, and as described above, the elastic body 113 blocks the upper end opening portion of the first attachment member 111, the inside of the first attachment member 111 is the liquid chamber 119 that is liquid-tightly sealed. The liquid is filled (i.e., enclosed) in the liquid chamber 119. Examples of the liquid include ethylene glycol, water, silicone oil, and the like.

The liquid chamber 119 is partitioned into a main liquid chamber 114 and an auxiliary liquid chamber 115 in the axial direction by the partition member 116. The main liquid chamber 114 is a space that has an inner peripheral surface 113c of the elastic body 113 as a portion of a wall surface thereof and is surrounded by the elastic body 113 and the partition member 116, and varies in internal volume depending on the deformation of the elastic body 113. The auxiliary liquid chamber 115 is a space that is surrounded by the diaphragm 120 and the partition member 116, and varies in internal volume depending on the deformation of the diaphragm 120. The vibration-damping device 101 having such a configuration is a compression-type device that is attached and used such that the main liquid chamber 114 is located on an upper side in the vertical direction and the auxiliary liquid chamber 115 is located on a lower side in the vertical direction.

The partition member 116 is formed with a plurality of first communication holes 142a that allow the main liquid chamber 114 and the accommodation chamber 142 to communicate with each other, and a second communication hole 142b that allows the auxiliary liquid chamber 115 and the accommodation chamber 142 to communicate with each other. A plurality of the second communication holes 142b are formed in the partition member 116, and the numbers of the first communication holes 142a and the second communication holes 142b are the same as each other. Each first communication hole 142a and each second communication hole 142b face each other in the axial direction. The inner diameters (i.e., flow passage cross-sectional areas) of the first communication hole 142a and the second communication hole 142b facing each other in the axial direction are the same as each other. The flow passage lengths of the first communication hole 142a and the second communication hole 142b facing each other in the axial direction are the same as each other. In addition, one second communication hole 142b may be formed in the partition member 116.

Here, in the partition member 116, an upper wall surface constituting a portion of an inner surface of the main liquid chamber 114 and a lower wall surface constituting a portion of an inner surface of the auxiliary liquid chamber 115 each have a circular shape coaxially disposed with the central axis O when viewed from the axial direction. The diameters of the upper wall surface and the lower wall surface of the partition member 116 are equal to each other. The upper wall surface of the partition member 116 faces the inner peripheral surface 113c of the elastic body 113 in the axial direction, and the lower wall surface of the partition member 116 faces an inner surface of the diaphragm 120 in the axial direction.

In the shown example, a recessed portion is formed over the entire region excluding an outer peripheral edge portion 116a on the upper wall surface of the partition member 116. The plurality of first communication holes 142a are open over the entire region of a bottom surface (hereinafter referred to as a first wall surface) 116b of the recessed portion. A recessed portion is formed over the entire region excluding an outer peripheral edge portion 116c on the lower wall surface of the partition member 116. The plurality of second communication holes 142b are open over the entire region of a bottom surface (hereinafter referred to as a second wall surface) 116d of the recessed portion. The recessed portion on each of the upper wall surface and the lower wall surface has a circular shape disposed coaxially with the central axis O when viewed from the axial direction, and sizes such as the inner diameter and the depth of each recessed portion are the same as each other.

The accommodation chamber 142 is formed in a portion of the partition member 116 located in the axial direction between the first wall surface 116b and the second wall surface 116d. The accommodation chamber 142 has a circular shape disposed coaxially with the central axis O when viewed from the axial direction. The diameter of the accommodation chamber 142 is larger than the diameters of the first wall surface 116b and the second wall surface 116d.

The movable member 141 is formed in a plate shape in which the front and back surfaces face in the axial direction. The movable member 141 has a circular shape disposed coaxially with the central axis O when viewed from the axial direction. The movable member 141 is formed of an elastic material such as rubber or a soft resin.

The partition member 116 is formed with an orifice passage 124 that allows the main liquid chamber 114 and the auxiliary liquid chamber 115 to communicate with each other. The orifice passage 124 is formed in a portion of the partition member 116 located in the axial direction between the outer peripheral edge portion 116a of the upper wall surface and the outer peripheral edge portion 116c of the lower wall surface. An upper end of the orifice passage 124 is located above the first wall surface 116b, and a lower end of the orifice passage 124 is located below the second wall surface 116d. The flow passage cross-sectional shape of the orifice passage 124 is an oblong shape long in the axial direction. The resonance frequency of the orifice passage 124 is lower than the resonance frequencies of the first communication hole 142a and the second communication hole 142b.

Figure 6:
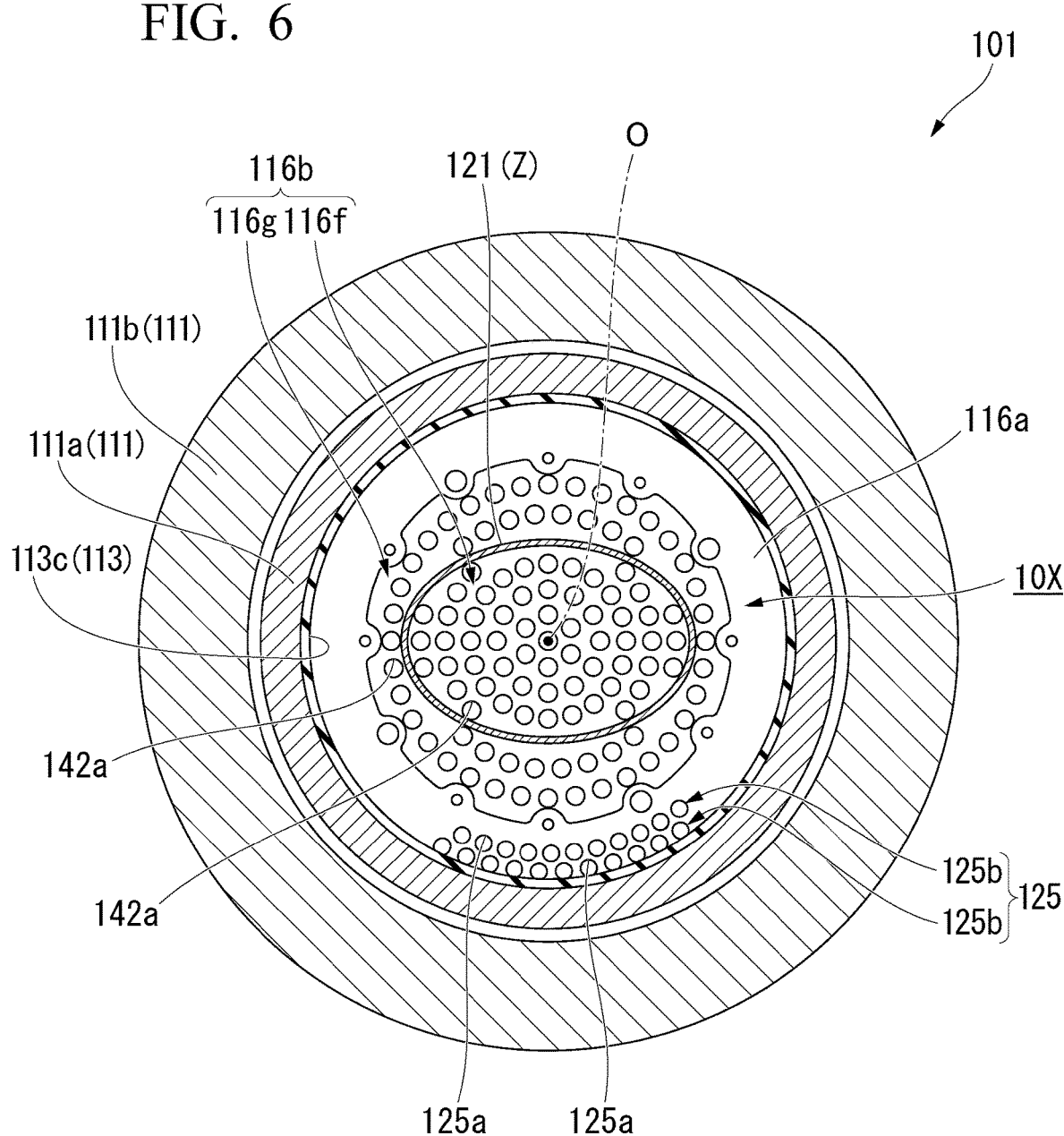
FIG. 6 is a cross-sectional view, taken along arrow line A-A, of the vibration-damping device shown in FIG. 5.

As shown in FIG. 6, an opening portion 125 of the orifice passage 124 on the main liquid chamber 114 side is formed on the outer peripheral edge portion 116a of the upper wall surface of the partition member 116. The opening portion 125 is configured such that a plurality of hole rows 125b in which a plurality of through-holes 125a are disposed at intervals in the circumferential direction are disposed at different positions in the radial direction and the circumferential direction. The inner diameter of the through-hole 125a is smaller than the inner diameter of the first communication hole 142a. Two hole rows 125b are disposed on the outer peripheral edge portion 116a of the upper wall surface of the partition member 116. The deviation amount of each hole row 125b in the circumferential direction and the deviation amount of each hole row 125b in the radial direction are each equal to the inner diameter of the through-hole 125a.

An opening portion on the auxiliary liquid chamber 115 side of the orifice passage 124 is formed on the outer peripheral edge portion 116c of the lower wall surface of the partition member 116 and is one opening having an opening area larger than the opening area of the opening portion 125 on the main liquid chamber 114 side, that is, the total sum of the opening areas of the plurality of through-holes 125a. The opening portion 125 on the main liquid chamber 114 side and the opening portion on the auxiliary liquid chamber 115 side in the orifice passage 124 are located radially outside the first communication hole 142a and the second communication hole 142b.

A flange portion 116e is formed at an upper end portion of the partition member 116 so as to protrude radially outward and continuously extend over the entire circumference. An upper surface of the flange portion 116e abuts the lower end opening edges of the inner tubular portion 111a and the outer tubular portion 111b of the first attachment member 111 via an annular upper sealing material 127. A lower surface of the flange portion 116e abuts an upper surface of the inner peripheral portion of the lower support portion 111c of the first attachment member 111 via an annular lower sealing material 128 that surrounds an upper end opening edge of the diaphragm 120 and an upper end opening edge of the diaphragm 120 from the outer side in the radial direction.

The partition member 116 includes an upper tubular body 131 and a lower tubular body 132 disposed so as to butt against each other in the axial direction and includes an upper wall 133 that blocks a lower end opening portion of the upper tubular body 131 and a lower wall 134 that blocks an upper end opening portion of the lower tubular body 132. In addition, the partition member 116 may be integrally formed.

The upper end opening edge of the upper tubular body 131 is the outer peripheral edge portion 116a of the aforementioned upper wall surface of the partition member 116. A flange portion 116e is formed at an upper end portion of the upper tubular body 131. A peripheral groove that is recessed upward and is open radially outward is formed at a portion of a lower end opening edge of the upper tubular body 131, which is located radially outside an inner peripheral portion of the lower end opening edge.

The upper wall 133 is fixed to the inner peripheral portion of the lower end opening edge of the upper tubular body 131. The upper wall 133 is formed with the first communication hole 142a.

A peripheral groove that is recessed downward is provided at a radially intermediate portion of the upper end opening edge of the lower tubular body 132, which faces the peripheral groove of the upper tubular body 131 in the axial direction. The orifice passage 124 is defined by this peripheral groove and the peripheral groove of the upper tubular body 131. An outer peripheral edge portion of the upper end opening edge of the lower tubular body 132, which is located radially outside the peripheral groove, abuts the lower surface of the flange portion 116e of the upper tubular body 131. The lower tubular body 132 is fitted into the upper end portion of the diaphragm 120, and the upper end portion of the diaphragm 120 is fitted into the lower support portion 111c of the first attachment member 111. Accordingly, the upper end portion of the diaphragm 120 is sandwiched in the radial direction between an outer peripheral surface of the lower tubular body 132 and an inner peripheral surface of the lower support portion 111c.

The lower wall 134 is fixed to the inner peripheral portion of the upper end opening edge of the lower tubular body 132. The lower wall 134 is formed with the second communication hole 142b.

At least one of the inner peripheral portion at the lower end opening edge of the upper tubular body 131 and the inner peripheral portion of the upper end opening edge of the lower tubular body 132 is formed with butting protrusions 134a and 134b that protrude toward and abut against toward the other. In the shown example, the butting protrusions 134a and 134b are formed on both the inner peripheral portion of the lower end opening edge of the upper tubular body 131 and the inner peripheral portion of the upper end opening edge of the lower tubular body 132. The butting protrusions 134a and 134b are formed in an annular shape disposed coaxially with the central axis O, and the upper wall 133 and the lower wall 134 are disposed radially inside the butting protrusions 134a and 134b with a gap in the axial direction from each other. The accommodation chamber 142 is defined by a lower surface of the upper wall 133, an upper surface of the lower wall 134, and inner peripheral surfaces of the butting protrusions 134a and 134b.

Also, in the present embodiment, a tubular member 121 that protrudes in the axial direction toward the elastic body 113 is disposed on the first wall surface 116b of the partition member 116 to which the first communication hole 142a is open and which constitutes a portion of the inner surface of the main liquid chamber 114.

The tubular member 121 is formed in a cylindrical shape and is disposed coaxially with the central axis O. The tubular member 121 extends straight in the axial direction. The axial length of the tubular member 121 is equal to or larger than 20% of the axial maximum height T of the main liquid chamber 114. In the shown example, the axial maximum height T of the main liquid chamber 114 is an axial distance between an upper end portion of the inner peripheral surface 113c of the elastic body 113, which extends radially inward from the bottom to the top, and the first wall surface 116b. The axial length of the tubular member 121 is set such that the upper end portion of the tubular member 121 does not abut against the inner peripheral surface 113c of the elastic body 113 when an axial static load is applied to the vibration-damping device 101 and when axial vibration is input.

In addition, as mentioned above, the inner peripheral surface 113c of the elastic body 113 is a portion that extends radially inward from the bottom to the top, and the upper end portion of the inner peripheral surface 113c of the elastic body 113 is an opening peripheral edge of a recessed portion of an inner surface of the elastic body 113 in a case where an upper end portion of the inner surface of the elastic body 113 that defines the main liquid chamber 114 is provided with a recessed portion that is recessed upward, as shown in the shown example.

An upper portion of the tubular member 121 protrudes upward from an upper end opening portion of the recessed portion formed on the upper wall surface of the partition member 116. An outer peripheral surface of the upper portion of the tubular member 121 faces a lower end portion of the inner peripheral surface of the inner tubular portion 111a of the first attachment member 111 and a lower end portion of the inner peripheral surface 113c of the elastic body 113 with a gap provided in the radial direction. The protruding length of the upper portion of the tubular member 121 from the upper end opening portion of the recessed portion is shorter than the depth of the recessed portion. Additionally, the protruding length is the axial distance between the portion of the inner peripheral surface 113c of the elastic body 113 where the upper end opening edge of the tubular member 121 faces in the axial direction and the upper end opening edge of the tubular member 121. The upper end opening edge of the tubular member 121 faces a portion deviating downward from a central portion in a direction in which the inner peripheral surface 113c extends, in a vertical cross-sectional view in the axial direction, on the inner peripheral surface 113c of the elastic body 113 extending radially inward from the bottom to the top.

The tubular member 121 has an elliptical shape when viewed from the axial direction. The minimum value of the radius of an inner peripheral surface of the tubular member 121 is larger than the maximum value of the radial distance between the outer peripheral surface of the tubular member 121 and the inner peripheral surface of the recessed portion formed on the upper wall surface of the partition member 116. The maximum value of the inner diameter of the tubular member 121 is equal to or larger than half of a maximum inner diameter R of the main liquid chamber 114. In the shown example, the maximum inner diameter R of the main liquid chamber 114 is the inner diameter of a lower end portion of the inner tubular portion 111a of the first attachment member 111. In the first wall surface 116b, the plane area of a portion 116f (hereinafter referred to as an inner portion) located inside the tubular member 121 is smaller than the plane area of a portion 116g (hereinafter referred to as an outer portion) located outside the tubular member 121.

The plurality of first communication holes 142a are open to both the inner portion 116f and the outer portion 116g of the first wall surface 116b. The plurality of first communication holes 142a face an upper surface of the movable member 141. The first communication hole 142a is provided in the entire region of the inner portion 116f and is provided in the entire region of the outer portion 116g in the circumferential direction.

The tubular member 121 is coupled to a portion of the first wall surface 116b located between adjacent first communication holes 142a and is disposed so as not to overlap the first communication hole 142a.

The number of the first communication holes 142a that are open to the outer portion 116g and the number of the first communication holes 142a that are open to the inner portion 116f are different from each other. In the shown example, the number of first communication holes 142a that are open to the outer portion 116g is smaller than the number of first communication holes 142a that are open to the inner portion 116f.

The proportion of the opening areas of the first communication holes 142a to the plane area of the outer portion 116g and the proportion of the opening areas of the first communication holes 142a to the plane area of the inner portion 116f are different from each other. In the shown example, the proportion of the opening areas of the first communication holes 142a to the plane area of the outer portion 116g is smaller than the proportion of the opening areas of the first communication holes 142a to the plane area of the inner portion 116f. The total sum of the opening areas of the first communication hole 142a that are open to the inner portion 116f is larger than the total sum of the opening areas of the first communication holes 142a that are open to the outer portion 116g.

The flow passage cross-sectional area of the first communication hole 142a that are open to the outer portion 116g and the flow passage cross-sectional area of the first communication hole 142a that are open to the inner portion 116f are the same as each other. In addition, the flow passage cross-sectional area of the first communication holes 142a that are open to the outer portion 116g and the flow passage cross-sectional area of the first communication holes 142a that are open to the inner portion 116f may be made different from each other.

In all excluding the first communication holes 142a that sandwich the tubular member 121 in the radial direction and are adjacent to each other among the plurality of first communication holes 142a that are open to the first wall surface 116b, the distances between the first communication holes 142a adjacent to each other are the same as each other and are smaller than the inner diameter of the first communication holes 142a. In addition, the distance between the first communication holes 142a adjacent to each other in the inner portion 116f and the distance between the first communication holes 142a adjacent to each other in the outer portion 116g may be made different from each other.

Here, the thicknesses of the upper wall 133 and the lower wall 134 are the same over the entire region, and the flow passage length of the first communication holes 142a that are open to the outer portion 116g and the flow passage lengths of the first communication holes 142a that are open to the inner portion 116f are the same as each other. In addition, the flow passage length of the first communication holes 142a that are open to the outer portion 116g and the flow passage length of the first communication holes 142a that are open to the inner portion 116f may be made different from each other.

The flow resistance of the liquid flowing through the first communication holes 142a that are open to the outer portion 116g and the flow resistance of the liquid flowing through the first communication holes 142a that are open to the inner portion 116f are the same as each other. In addition, the flow resistance of the liquid flowing through the first communication holes 142a that are open to the outer portion 116g and the flow resistance of the liquid flowing through the first communication holes 142a that are open to the inner portion 116f may be made different from each other.

One of the partition member 116 and the tubular member 121 may form the elasticity adjusting unit Z in which the elasticity of the elastic body 113 is made different in the circumferential direction around the central axis O of the first attachment member 111. In the present embodiment, the tubular member 121 that forms the elasticity adjusting unit Z will be described.

Also, in the present embodiment, at least part of the inner peripheral surface of the elastic body 113 and at least part of the outer peripheral surface of the tubular member 121 face each other in the radial direction and define an annular gap 10X that extends in the circumferential direction. The radial widths of the annular gap 10X at some or a plurality of spots in the circumferential direction are different from the radial widths of the annular gap 10X at the other portions. The tubular member 121 that forms the elasticity adjusting unit Z is formed such that the radial widths of the annular gap 10X at some or a plurality of spots in the circumferential direction are different from the radial widths of the annular gap 10X at the other portions.

In the outer portion 116g, the total sum of the opening areas of the first communication holes 142a that are open to the portion of the annular gap 10X located at the same circumferential position as a radially wider portion is larger than the total sum of the opening areas of the first communication holes 142a that are open to the portion located of the annular gap 10X at the same circumferential position as a radially narrower portion. In addition, the total sum of the opening areas of the former may be equal to or less than the total sum of the opening areas of the latter.

In the shown example, as described above, the outer peripheral surface of the upper portion of the tubular member 121 and a lower end portion of the inner peripheral surface 113c of the elastic body 113 face each other with a gap in the radial direction and defines the annular gap 10X. In the annular gap 10X, portions having a minimum radial width are separately provided at positions facing each other across the central axis O in one direction, and portions having a maximum radial width are separately provided at positions facing each other across the central axis O in the other direction orthogonal to the one direction.

The shapes of the portions facing each other in the radial direction on each of the inner peripheral surface 113c of the elastic body 113 and the outer peripheral surface of the tubular member 121 are different from each other when viewed from the axial direction. The inner peripheral surface 113c of the elastic body 113 has a circular shape when viewed from the axial direction over the entire length in the axial direction, and the outer peripheral surface of the tubular member 121 has an elliptical shape when viewed from the axial direction over the entire length in the axial direction. The central axes of the portions facing each other in the radial direction on each of the inner peripheral surface 113c of the elastic body 113 and the outer peripheral surface of the tubular member 121 coincide with the central axis O of the first attachment member 111. The inner peripheral surface of the tubular member 121 has an elliptical shape when viewed from the axial direction over the entire length in the axial direction. The wall thickness of the tubular member 121 is the same over the entire region.

The outer peripheral surface of the tubular member 121 has an elliptical shape provided in an orientation in which a major axis extends in the one direction and a minor axis extends in the other direction, when viewed from the axial direction. The radial width of the annular gap 10X changes gradually as the circumferential position is different so as to be minimum between an end portion in the one direction on the outer peripheral surface of the tubular member 121 and the inner peripheral surface 113c of the elastic body 113 and so as to be maximum between the end portion in the other direction on the outer peripheral surface of the tubular member 121 and the inner peripheral surface 113c of the elastic body 113.

In the vibration-damping device 101 having such a configuration, when idle vibration having a relatively high frequency in the low frequency vibration is input in the axial direction, the movable member 141 is deformed or displaced in the accommodation chamber 142 and the liquid in the liquid chamber 119 flows through the first communication holes 142a and the second communication holes 142b, so that this vibration is damped and absorbed. Additionally, when the shake vibration having a relatively low frequency in the low frequency vibration is input in the axial direction, this vibration is damped and absorbed by the liquid in the liquid chamber 119 flowing through the orifice passage 124.

As described above, according to the vibration-damping device 101 according to the present embodiment, the tubular member 121 protruding toward the elastic body 113 is disposed on the first wall surface 116b of the partition member 116. Thus, when the elastic body 113 is deformed in a secondary vibration mode in a vertical cross-sectional view in the axial direction due to the input of medium frequency vibration in the axial direction, a node portion generated at a central portion of the elastic body 113 in the related art deviates to the second attachment member 112 side due to, for example, the fact that it is difficult for the liquid between the inner peripheral surface of the main liquid chamber 114 and the outer peripheral surface of the upper portion of the tubular member 121 to flow. As a result, in the elastic body 113, a portion located closer to the first attachment member 111 side than the node portion is more easily deformed than a portion located closer to the second attachment member 112 side than the node portion. Accordingly, when the medium frequency vibration in the axial direction is input, the portion of the elastic body 113 located closer to the first attachment member side 111 than the node portion is positively deformed, it is possible to apparently reduce the stiffness of the elastic body 113, and this vibration can be damped and absorbed.

Additionally, since the plurality of first communication holes 142a are open to both the inner portion 116f and the outer portion 116g of the first wall surface 116b, it is possible to dispose many first communication holes 142a in the first wall surface 116b, and, for example, the idle vibration having a relatively high frequency in the low frequency vibration can be reliably damped and absorbed.

In the annular gap 10X between the inner peripheral surface of the elastic body 113 and the outer peripheral surface of the tubular member 121, the radial widths at some or a plurality of spots in the circumferential direction are different from the radial widths at the other portions. Thus, for example, the flow state of the liquid during the input of vibration, such as flow velocity, can be adjusted for each circumferential position in the annular gap 10X. Accordingly, the position of the node portion generated in the elastic body 113 when the medium frequency vibration in the axial direction is input can be adjusted at each circumferential position. Additionally, when the medium frequency vibration in the orientation in which a radially narrower portion (hereinafter referred to as a narrow portion) is located in the annular gap 10X with respect to the central axis O in the lateral direction intersecting the axial direction is input and when the medium frequency vibration in the orientation in which a radially wider portion (hereinafter referred to as a wide portion) is located is input, it is possible to make the degree of flow of the liquid located in the annular gap 10X different, and the elasticity of the vibration-damping device 101 to be developed can be made different. That is, in the tubular member 121 that forms the elasticity adjusting unit Z, it is possible to apparently make the stiffness of the elastic body 113 different in the circumferential direction around the central axis O of the first attachment member 111, that is, it is possible to apparently make the elasticity of the elastic body 113 different. Accordingly, for example, tuning can be easily performed even in a case where the positions of the elasticities of the elastic body 113 and the node portions are different in the front-rear direction and the left-right direction in the radial direction.

In addition, the elasticities of the elastic body 113 may be made different from each other, for example, by making the thicknesses or lengths of the elastic body 113 different from each other in the front-rear direction and the left-right direction.

Specifically, the liquid becomes difficult to flow in the narrow portion of the annular gap 10X. Thus, when the medium frequency vibration in the axial direction is input, the node portion of the elastic body 113 located at the same circumferential position as the narrow portion deviates relatively largely toward the second attachment member 112 extending in the axial direction, and the elasticity of the vibration-damping device 101 to be developed is higher when the medium frequency vibration is input in an orientation in which the narrow portion is located with respect to the central axis O in the lateral direction.

The liquid flows easily in the wide portion of the annular gap 10X. Thus, when the medium frequency vibration in the axial direction is input, the node portion of the elastic body 113 located at the same circumferential position as the wide portion deviates relatively slightly toward the second attachment member 112 extending in the axial direction, and the elasticity of the vibration-damping device 101 to be developed is lower when the medium frequency vibration is input in an orientation in which the wide portion is located with respect to the central axis O in the lateral direction.

The shapes of the portions facing each other in the radial direction on each of the inner peripheral surface of the elastic body 113 and the outer peripheral surface of the tubular member 121 are different from each other when viewed from the axial direction. Thus, It is possible to easily provide the annular gap in which the radial widths of the annular gap 10X at some or a plurality of spots in the circumferential direction are different from the radial widths of the annular gap 10X at the other portions.

Since the central axes of the portions facing each other in the radial direction on each of the inner peripheral surface of the elastic body 113 and the outer peripheral surface of the tubular member 121 coincide with each other, the vibration-damping device 1 having the above-mentioned working effects can be easily obtained.

In the annular gap 10X, portions having a minimum radial width are separately provided at positions facing each other across the central axis O in one direction, and portions having a maximum radial width are separately provided at positions facing each other across the central axis O in the other direction orthogonal to the one direction. Accordingly, when the medium frequency vibration is input in the orientation in which the portion having the minimum radial width in the annular gap 10X is located with respect to the central axis O in the lateral direction and when the medium-frequency vibration is input in the orientation in which the portion having the maximum radial width in the annular gap X is located, the elasticities of the vibration-damping device 101 to be developed can be reliably made different from each other.

Additionally, since the axial length of the tubular member 121 is equal to or larger than 20% of the axial maximum height T of the main liquid chamber 114, the medium frequency vibration in the axial direction can be reliably damped and absorbed.

Additionally, since the maximum value of the inner diameter of the tubular member 121 is equal to or larger than half of the maximum inner diameter R of the main liquid chamber 114, the medium frequency vibration in the axial direction can be reliably damped and absorbed.

A vibration-damping device according to a first aspect of the present invention is vibration-damping device including a tubular first attachment member that is coupled to any one of a vibration generating part and a vibration receiving part, and a second attachment member that is coupled to the other thereof; an elastic body that elastically couples both the first and second attachment members to each other; a partition member that partitions a liquid chamber in the first attachment member in which a liquid is enclosed into a main liquid chamber having the elastic body as a portion of a partition wall in an axial direction and an auxiliary liquid chamber along a central axis of the first attachment member; and a movable member that is deformably or displaceably accommodated in an accommodation chamber provided in the partition member. The partition member is provided with an orifice passage that allows the main liquid chamber and the auxiliary liquid chamber to communicate with each other, a plurality of first communication holes that allow the main liquid chamber and the accommodation chamber to communicate with each other, and a second communication hole that allows the auxiliary liquid chamber and the accommodation chamber to communicate with each other. A tubular member that protrudes in the axial direction toward the elastic body is disposed on a first wall surface of the partition member to which the first communication hole is open and which constitutes a portion of an inner surface of the main liquid chamber. The plurality of first communication holes are open to both an inner portion located inside the tubular member and an outer portion located outside the tubular member, on the first wall surface. One of the partition member and the tubular member forms an elasticity adjusting unit in which an elasticity of the elastic body is made to be different in a circumferential direction around the central axis.

According to the vibration-damping device of one aspect of the present invention, the tubular member protruding toward the elastic body is disposed on the first wall surface of the partition member. Thus, when the elastic body is deformed in a secondary vibration mode in a vertical cross-sectional view in the axial direction due to the input of medium frequency vibration in the axial direction, a node portion generated at a central portion of the elastic body in the related art deviates to the second attachment member side due to, for example, the fact that it is difficult for the liquid between the inner peripheral surface of the main liquid chamber and the outer peripheral surface of the tubular member to flow. As a result, in the elastic body, a portion located closer to the first attachment member side than the node portion is more easily deformed than a portion located closer to the second attachment member side than the node portion. Accordingly, when the medium frequency vibration in the axial direction is input, the portion of the elastic body located closer to the first attachment member side than the node portion is positively deformed, it is possible to reduce the stiffness of the elastic body is apparently reduced, and this vibration can be damped and absorbed.

Additionally, since the plurality of first communication holes are open to both the inner portion located inside the tubular member and the outer portion located outside the tubular member on the first wall surface, it is possible to dispose many first communication holes in the first wall surface, and, for example, idle vibration having a relatively high frequency in the low frequency vibration can be reliably damped and absorbed.

Additionally, since one of the partition member and the tubular member forms the elasticity adjusting unit that makes the elasticity of the elastic body different in the circumferential direction around the central axis, the elasticities of the elastic body can be apparently made different in the circumferential direction around the central axis.

The elastic body is formed in a tubular shape that extends in the axial direction.

At least part of the inner peripheral surface of the elastic body and at least part of the outer peripheral surface of the tubular member face each other in the radial direction and define an annular gap that extends in the circumferential direction around the central axis.

The tubular member that forms the elasticity adjusting unit may be formed such that the radial widths of the annular gap at some or a plurality of spots in the circumferential direction are different from the radial widths of the annular gap at the other portions.

In this case, the tubular member that forms the elasticity adjusting unit is formed such that the radial widths of the annular gap at some or a plurality of spots in the circumferential direction are different from the radial widths of the annular gap at the other portions. That is, in the annular gap between the inner peripheral surface of the elastic body and the outer peripheral surface of the tubular member, the radial widths at some or a plurality of spots in the circumferential direction are different from the radial widths at the other portions. Thus, for example, the flow state of the liquid during the input of vibration, such as flow velocity, can be adjusted for each circumferential position in the annular gap. Accordingly, the position of the node portion generated in the elastic body when the medium frequency vibration in the axial direction is input can be adjusted at each circumferential position. Additionally, when the medium frequency vibration in the orientation in which a radially narrower portion (hereinafter referred to as a narrow portion) is located in the annular gap with respect to the central axis in the lateral direction intersecting the axial direction is input and when the medium frequency vibration in the orientation in which a radially wider portion (hereinafter referred to as a wide portion) is located is input, it is possible to make the degree of flow of the liquid located in the annular gap different, and the elasticity of the vibration-damping device to be developed can be apparently made different. Accordingly, for example, tuning can be easily performed even in a case where the positions of the elasticities of the elastic body and the node portions are different in the front-rear direction and the left-right direction in the radial direction.

Specifically, the liquid becomes difficult to flow in the narrow portion of the annular gap. Thus, when the medium frequency vibration in the axial direction is input, the node portion of the elastic body located at the same circumferential position as the narrow portion deviates relatively largely toward the second attachment member extending in the axial direction, and the elasticity of the vibration-damping device to be developed is higher when the medium frequency vibration is input in an orientation in which the narrow portion is located with respect to the central axis in the lateral direction.

The liquid flows easily in the wide portion of the annular gap. Thus, when the medium frequency vibration in the axial direction is input, the node portion of the elastic body located at the same circumferential position as the wide portion deviates relatively slightly toward the second attachment member extending in the axial direction, and the elasticity of the vibration-damping device to be developed is lower when the medium frequency vibration is input in an orientation in which the wide portion is located with respect to the central axis in the lateral direction.

The shapes of the portions facing each other in the radial direction on each of the inner peripheral surface of the elastic body and the outer peripheral surface of the tubular member may be different from each other when viewed from the axial direction.

In this case, the shapes of the portions facing each other in the radial direction on each of the inner peripheral surface of the elastic body and the outer peripheral surface of the tubular member are different from each other when viewed from the axial direction. Thus, It is possible to easily provide the annular gap in which the radial widths of the annular gap at some or a plurality of spots in the circumferential direction are different from the radial widths of the annular gap at the other portions.

Since the central axes of the portions facing each other in the radial direction on each of the inner peripheral surface of the elastic body and the outer peripheral surface of the tubular member may coincide with each other.

In this case, since the central axes of the portions facing each other in the radial direction on each of the inner peripheral surface of the elastic body and the outer peripheral surface of the tubular member coincide with each other, the vibration-damping device having the above-mentioned working effects can be easily obtained.

In the annular gap, the portions having the minimum radial width may be separately provided at positions facing each other across the central axis in one direction, and the portions having the maximum radial width may be separately provided at positions facing each other across the central axis in the other direction orthogonal to the one direction.

In this case, in the annular gap, the portions having the minimum radial width are separately provided at positions facing each other across the central axis in one direction, and the portions having the maximum radial width are separately provided at positions facing each other across the central axis in the other direction orthogonal to the one direction. Accordingly, when the medium frequency vibration is input in the orientation in which the portion having the minimum radial width in the annular gap is located with respect to the central axis in the lateral direction and when the medium-frequency vibration is input in the orientation in which a portion where the radial width becomes maximum is located, the elasticities of the vibration-damping device to be developed can be reliably made different from each other.

In addition, the technical scope of the invention is not limited to the above embodiment, and various changes can be made without departing the spirit of the invention.

For example, the shapes of the portions facing each other in the radial direction on each of the inner peripheral surface 113c of the elastic body 13 and the outer peripheral surface of the tubular member 121 may be made the same each other when viewed from the axial direction, and the central axis of each of these portions may be made eccentric.

For example, when viewed from the axial direction, the outer peripheral surface of the tubular member 121 may have a circular shape instead of a non-circular shape such as an elliptical shape or an angular shape, and the inner peripheral surface 113c of the elastic body 113 may have a non-circular shape such as an elliptical shape or an angular shape instead of the circular shape.

In the above embodiment, the inner peripheral surface of the tubular member 121 may have a circular shape when viewed from the axial direction. That is, by making the wall thickness of the tubular member 121 different at some or a plurality of spots in the circumferential direction, the radial widths of the annular gap 10X at some or a plurality of spots in the circumferential direction may be made different from the radial widths of the annular gap 10X at the other portions.

The radial width of the annular gap 10X may be made different from the other portions, for example, only at some or a plurality of spots in the circumferential direction.

As the annular gap 10X, for example, a configuration in which a portion having a minimum radial width and a portion having a maximum radial width are separately provided at positions facing each other across the central axis O in one direction, or the like may be adopted.

The outer peripheral surface of the tubular member 121 may face the inner peripheral surface 113c of the elastic body 113 with a gap provided in the radial direction over the entire region.

In the above embodiment, a configuration in which the shapes of the outer peripheral surface of the tubular member 121 and the first wall surface 116b viewed from the axial direction are different from each other is shown, but these shapes may be made the same.

The number of the first communication holes 142a that are open to the outer portion 116g may be equal to or larger than the number of the first communication holes 142a that are open to the inner portion 116f.

The proportion of the opening areas of the first communication holes 142a to the plane area of the outer portion 116g may be equal to or larger than the proportion of the opening areas of the first communication holes 142a to the plane area of the inner portion 116f.

In the above embodiment, the total sum of the opening areas of the first communication holes 142a that are open to the inner portion 116f is larger than the total sum of the opening areas of the first communication holes 142a that are open to the outer portion 116g. However, the present invention is not limited to this, for example, the total sum of the opening areas of the first communication holes 142a that are open to the inner portion 116f may be equal to or less than the total sum of the opening areas of the first communication holes 142a that are open to the outer portion 116g.

Additionally, although a configuration in which the tubular member 121 is coupled to the first wall surface 116b so as not to overlap the first communication holes 142a is shown, the tubular member 121 may be coupled to the first wall surface 116b so as to overlap the first communication holes 142a.

Additionally, although the recessed portion is formed on the upper wall surface of the partition member 116, the recessed portion may not be formed.

Additionally, in the above embodiments, the compression type vibration-damping device 101 in which the positive pressure acts on the main liquid chamber 114 as the support load acts has been described. However, the present invention is also applicable to a hanging-type vibration-damping device that is attached such that the main liquid chamber 114 is located on the lower side in the vertical direction and the auxiliary liquid chamber 115 is located on the upper side in the vertical direction and in which the negative pressure acts on the main liquid chamber 114 as the support load acts.

Additionally, the vibration-damping device 101 according to the present invention is not limited to an engine mount of a vehicle and can also be applied to those other than the engine mount. For example, the vibration-damping devices are applicable to mounts of power generators loaded on construction machines or are applicable to mounts of machines installed in factories or the like.

In addition, it is possible to appropriately replace the constituent elements in the above embodiments with well-known constituent elements without departing from the spirit of the present invention. Additionally, the above embodiments and modification examples may be appropriately combined.

With respect to the first to third embodiments described above, the technical scope of the invention is not limited to the above first to third embodiments, and various changes can be made to the first to third embodiments without departing the spirit of the invention. For example, the respective constituent elements of the first to third embodiments may be appropriately combined with each other without departing from the scope of the present invention.

INDUSTRIAL APPLICABILITY

According to the present invention, the medium frequency vibration can be damped and absorbed.

REFERENCE SIGNS LIST 1, 2, 101: Vibration-damping device
11, 111: First attachment member
12, 112: Second attachment member
13, 113: Elastic body
14, 114: Main liquid chamber
15, 115: Auxiliary liquid chamber
16, 116: Partition member
16b, 116b: First wall surface
16f, 116f: Inner portion
16g, 116g: Outer portion
19, 119: Liquid chamber
21, 121: Tubular member
24, 124: Orifice passage
41, 141: Movable member
42, 142: Accommodation chamber
42a, 142a: First communication hole
42b, 142b: Second communication hole
O: Central axis
X: First region
Y: Second region
Z: Elasticity adjusting unit
10X: Annular gap

The invention claimed is:

1. A vibration-damping device comprising:
a tubular first attachment member that is coupled to any one of a vibration generating part and a vibration receiving part, and a second attachment member that is coupled to the other thereof;
an elastic body that elastically couples both the first and second attachment members to each other;
a partition member that partitions a liquid chamber, in which a liquid is enclosed and with which the first attachment member is provided, into a main liquid chamber and an auxiliary liquid chamber in an axial direction along a central axis of the first attachment member, the main liquid chamber having the elastic body as a portion of a partition wall; and a movable member that is deformably or displaceably accommodated in an accommodation chamber provided in the partition member, wherein the partition member is provided with an orifice passage, a plurality of first communication holes, and a second communication hole, the orifice passage which allows the main liquid chamber and the auxiliary liquid chamber to communicate with each other, the plurality of first communication holes which allow the main liquid chamber and the accommodation chamber to communicate with each other, and the second communication hole which allows the auxiliary liquid chamber and the accommodation chamber to communicate with each other, a tubular member is disposed on a first wall surface of the partition member, the tubular member which protrudes in the axial direction toward the elastic body, the first wall surface to which the plurality of first communication holes are open and which constitutes a portion of an inner surface of the main liquid chamber, the plurality of first communication holes are open to both an inner portion and an outer portion on the first wall surface, the inner portion located inside the tubular member, and the outer portion located outside the tubular member, and one of the partition member and the tubular member forms an elasticity adjusting unit in which an elasticity of the elastic body is made to be apparently different in a circumferential direction around the central axis.

2. The vibration-damping device according to claim 1, wherein in the partition member forming the elasticity adjusting unit, a flow resistance of the liquid flowing through the first communication holes that are open to a first region in the circumferential direction around the central axis in the first wall surface and a flow resistance of the liquid flowing through the first communication holes that are open to a second region in the circumferential direction in the first wall surface are different from each other.

3. The vibration-damping device according to claim 2, wherein a flow passage cross-sectional area of the first communication holes that are open to the first region and a flow passage cross-sectional area of the first communication holes that are open to the second region are different from each other.

4. The vibration-damping device according to claim 2, wherein a flow passage length of the first communication holes that are open to the first region and a flow passage length of the first communication holes that are open to the second region are different from each other.

5. The vibration-damping device according to claim 4, wherein a proportion of opening areas of the first communication holes to a plane area of the first region and a proportion of opening areas of the first communication holes to a plane area of the second region are different from each other.

6. The vibration-damping device according to claim 2, wherein when viewed from the axial direction, the first region is separately provided at positions facing each other across the central axis in one direction, and the second region is separately provided at positions facing each other across the central axis in the other direction orthogonal to the one direction.

7. The vibration-damping device according to claim 1, wherein in the partition member forming the elasticity adjusting unit, the plurality of first communication holes are separately open to a first region of the first wall surface in a circumferential direction around the central axis and a second region provided at a circumferential position different from the first region, and a proportion of opening areas of the first communication holes to a plane area of the first region and a proportion of opening areas of the first communication holes to a plane area of the second region are different from each other.

8. The vibration-damping device according to claim 7, wherein a flow passage cross-sectional area of the first communication holes that are open to the first region and a flow passage cross-sectional area of the first communication holes that are open to the second region are different from each other.

9. The vibration-damping device according to claim 7, wherein a distance between the first communication holes adjacent to each other in the first region and a distance between the first communication holes adjacent to each other in the second region are different from each other.

10. The vibration-damping device according to claim 7, wherein when viewed from the axial direction, the first region is separately provided at positions facing each other across the central axis in one direction, and the second region is separately provided at positions facing each other across the central axis in the other direction orthogonal to the one direction.

11. The vibration-damping device according to claim 1, wherein the elastic body is formed in a tubular shape that extends in the axial direction, at least part of an inner peripheral surface of the elastic body and at least part of an outer peripheral surface of the tubular member face each other in a radial direction and define an annular gap that extends in the circumferential direction around the central axis, and the tubular member forming the elasticity adjusting unit is formed such that radial widths of the annular gap at some or a plurality of spots in the circumferential direction are different from radial widths of the annular gap at other portions.

12. The vibration-damping device according to claim 11, wherein shapes of portions facing each other in the radial direction on each of the inner peripheral surface of the elastic body and the outer peripheral surface of the tubular member are different from each other when viewed from the axial direction.

13. The vibration-damping device according to claim 11, wherein central axes of portions facing each other in the radial direction on each of the inner peripheral surface of the elastic body and the outer peripheral surface of the tubular member coincide with each other.

14. The vibration-damping device according to claim 1, wherein in the annular gap, portions having a minimum radial width are separately provided at positions facing each other across the central axis in one direction, and portions having a maximum radial width are separately provided at positions facing each other across the central axis in the other direction orthogonal to the one direction.

15. The vibration-damping device according to claim 1, wherein in the partition member forming the elasticity adjusting unit, a flow resistance of the liquid flowing through the first communication holes that are open to a first region in the circumferential direction around the central axis in the first wall surface and a flow resistance of the liquid flowing through the first communication holes that are open to a second region in the circumferential direction in the first wall surface are different from each other, and a proportion of opening areas of the first communication holes to a plane area of the first region and a proportion of opening areas of the first communication holes to a plane area of the second region are different from each other.

16. The vibration-damping device according to claim 1, wherein in the partition member forming the elasticity adjusting unit, a flow resistance of the liquid flowing through the first communication holes that are open to a first region in the circumferential direction around the central axis in the first wall surface and a flow resistance of the liquid flowing through the first communication holes that are open to a second region in the circumferential direction in the first wall surface are different from each other, and when viewed from the axial direction, the first region is separately provided at positions facing each other across the central axis in one direction, and the second region is separately provided at positions facing each other across the central axis in the other direction orthogonal to the one direction.

17. The vibration-damping device according to claim 2, wherein a flow passage cross-sectional area of the first communication holes that are open to the first region and a flow passage cross-sectional area of the first communication holes that are open to the second region are different from each other, and a flow passage length of the first communication holes that are open to the first region and a flow passage length of the first communication holes that are open to the second region are different from each other.

18. The vibration-damping device according to claim 2, wherein a flow passage cross-sectional area of the first communication holes that are open to the first region and a flow passage cross-sectional area of the first communication holes that are open to the second region are different from each other, and a proportion of opening areas of the first communication holes to a plane area of the first region and a proportion of opening areas of the first communication holes to a plane area of the second region are different from each other.

19. The vibration-damping device according to claim 2, wherein a flow passage cross-sectional area of the first communication holes that are open to the first region and a flow passage cross-sectional area of the first communication holes that are open to the second region are different from each other, and when viewed from the axial direction, the first region is separately provided at positions facing each other across the central axis in one direction, and the second region is separately provided at positions facing each other across the central axis in the other direction orthogonal to the one direction.

20. The vibration-damping device according to claim 2, wherein a flow passage length of the first communication holes that are open to the first region and a flow passage length of the first communication holes that are open to the second region are different from each other, and a proportion of opening areas of the first communication holes to a plane area of the first region and a proportion of opening areas of the first communication holes to a plane area of the second region are different from each other.

* * * * *